(12) United States Patent
Chapman et al.

(10) Patent No.: US 11,845,201 B2
(45) Date of Patent: Dec. 19, 2023

(54) METHODS OF CONFIGURING GAS FLOW IN ADDITIVE-MANUFACTURING MACHINES

(71) Applicant: The Boeing Company, Chicago, IL (US)

(72) Inventors: Eric M. Chapman, Lake Tapps, WA (US); Cory C. Cunningham, Auburn, WA (US); Troy A. Haworth, Snohomish, WA (US); Dana Alexander Henshaw, Seattle, WA (US); Matthew Thomas Hollinger, Issaquah, WA (US); Ashley Marie Jones, Seattle, WA (US); Kevin Michael Mejia, Sammamish, WA (US); Christopher Perez, Bothell, WA (US); Russell William Waymire, Gig Harbor, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/492,031

(22) Filed: Oct. 1, 2021

(65) Prior Publication Data

US 2023/0105996 A1    Apr. 6, 2023

(51) Int. Cl.
| | | |
|---|---|---|
| *B29C 64/386* | (2017.01) |
| *B29C 64/153* | (2017.01) |
| *B33Y 50/00* | (2015.01) |
| *B33Y 10/00* | (2015.01) |
| *B29C 64/371* | (2017.01) |
| *B33Y 30/00* | (2015.01) |

(52) U.S. Cl.
CPC .......... *B29C 64/386* (2017.08); *B29C 64/153* (2017.08); *B29C 64/371* (2017.08); *B33Y 10/00* (2014.12); *B33Y 30/00* (2014.12); *B33Y 50/00* (2014.12)

(58) Field of Classification Search
CPC ... B29C 64/364; B29C 64/371; B29C 64/386; B29C 64/393
See application file for complete search history.

(56) References Cited

U.S. PATENT DOCUMENTS

| | | | | |
|---|---|---|---|---|
| 9,989,396 | B2 * | 6/2018 | Gold | B33Y 50/02 |
| 10,488,309 | B2 * | 11/2019 | Slaughter | G01N 3/02 |
| 11,072,025 | B2 * | 7/2021 | Martin | B23K 26/082 |
| 11,318,535 | B2 * | 5/2022 | Mamrak | B29C 64/393 |

(Continued)

*Primary Examiner* — Xiao S Zhao
*Assistant Examiner* — Nicholas J Chidiac
(74) *Attorney, Agent, or Firm* — Kwan & Olynick LLP

(57) ABSTRACT

A method of configuring an additive-manufacturing machine comprises a chamber, a platform, movable inside the chamber and comprising a build-plane surface, and a laser, having a laser focal plane within the chamber. The method comprising steps of flowing a gas within the chamber in accordance with a first set of process parameters and identifying a value of a flow characteristic of the gas at a predetermined point in the laser focal plane while flowing the gas within the chamber in accordance with the first set of process parameters. The method also comprises additively manufacturing a test coupon using the laser while flowing the gas within the chamber in accordance with the first set of process parameters, wherein the test coupon has a test-coupon peripheral surface.

19 Claims, 9 Drawing Sheets

(56) References Cited

U.S. PATENT DOCUMENTS

| | | | | |
|---|---|---|---|---|
| 11,318,682 | B2* | 5/2022 | Sosnowski | B33Y 40/00 |
| 11,478,853 | B2* | 10/2022 | Martin | B29C 64/371 |
| 2017/0146382 | A1* | 5/2017 | Gold | B22F 12/90 |
| 2018/0126650 | A1* | 5/2018 | Murphree | B29C 64/245 |
| 2018/0178284 | A1* | 6/2018 | Martin | B23K 15/0093 |
| 2018/0178285 | A1* | 6/2018 | Martin | B29C 64/268 |
| 2018/0178286 | A1* | 6/2018 | Martin | B29C 64/393 |
| 2018/0178287 | A1* | 6/2018 | Mamrak | B23K 26/342 |
| 2018/0356322 | A1* | 12/2018 | Slaughter | G01N 3/28 |
| 2020/0108464 | A1* | 4/2020 | Shibazaki | B29C 64/153 |
| 2021/0023795 | A1* | 1/2021 | Sosnowski | B29C 64/343 |
| 2021/0122117 | A1* | 4/2021 | Schade | B22F 10/322 |
| 2021/0206102 | A1* | 7/2021 | Jeong | B33Y 50/00 |

* cited by examiner

METHODS OF CONFIGURING GAS FLOW IN ADDITIVE-MANUFACTURING MACHINES

BACKGROUND

Additive manufacturing uses a layer-upon-layer approach to build three-dimensional parts. This approach enables parts with complex shapes to be produced, such as hollow parts or parts with internal truss structures. Selective laser sintering (SLS) is an additive-manufacturing process that utilizes a laser beam to sinter powdered materials (e.g., plastic, metal, ceramic) and to convert these materials into solid structures. Specifically, a laser beam is directed at a powder layer, positioned at the laser focal plane. The laser beam selectively transforms portions of this powder layer into solidified material. The remaining portions of the powder layer are eventually removed. SLS can introduce fumes and other contaminants into the processing environment. These contaminants need to be removed, at least from the laser line of sight, to minimize the interference with the laser beam. Gas recirculation systems have been proposed for such contamination removal within additive-manufacturing machines. However, gas flow variations can interfere with the decontamination efficiency and cause random imperfections, inclusions, and voids in the sintered parts. Furthermore, these gas flow variations can be caused by various internal factors that are not being directly controlled, such as filter clogging and the like.

SUMMARY

Accordingly, apparatuses and methods, intended to address at least the above-identified concerns, would find utility.

The following is a non-exhaustive list of examples of the subject matter, disclosed herein.

Disclosed herein is a method of configuring an additive-manufacturing machine that comprises a chamber, a platform, movable inside the chamber and comprising a build-plane surface, and a laser, having a laser focal plane within the chamber. The method comprises steps of flowing a gas within the chamber in accordance with a first set of process parameters and identifying a value of a flow characteristic of the gas at a predetermined point in the laser focal plane while flowing the gas within the chamber in accordance with the first set of process parameters. The method also comprises additively manufacturing a test coupon using the laser while flowing the gas within the chamber in accordance with the first set of process parameters, wherein the test coupon has a peripheral surface. The method further comprises comparing a value of a physical property at a predetermined location on or underneath the peripheral surface of the test coupon to a desired value of the physical property. The method additionally comprises flowing the gas within the chamber in accordance with a second set of process parameters, different from the first set of process parameters, when a difference between the value of the physical property at the predetermined location on or underneath the peripheral surface of the test coupon and the desired value of the physical property is outside of a predetermined range.

The value of the physical property at the predetermined location on or underneath the peripheral surface of the test coupon indicates whether the additive-manufacturing machine can be used for manufacturing actual parts, e.g., when the difference is within the predetermined range. The value is indicative of the expected properties of the manufactured parts. At the same time, this depends on the process parameters used for additive manufacturing of the test coupon. Specifically, this value depends on the first set of the process parameters used to flow the gas within the chamber. As such, any changes to these process parameters can result in changes to the value of the physical property at the predetermined location on or underneath the peripheral surface of the test coupon. This feedback is used to determine process parameters that yield the desired value of the physical property, e.g., the one within the predetermined range. Process parameters can be changed (e.g., from the first set of process parameters to the second set of process parameters) until the difference between the value of the physical property at the predetermined location on or the underneath peripheral surface of the test coupon and the desired value of the physical property is within the predetermined range.

Also disclosed herein is a method of configuring an additive-manufacturing machine that comprises a chamber, a platform, movable inside the chamber and comprising a build-plane surface, and a laser, having a laser focal plane within the chamber. The method comprises steps of flowing a gas within the chamber in accordance with a first set of process parameters and identifying a value of a flow characteristic of the gas at a predetermined point in the laser focal plane while flowing the gas within the chamber in accordance with the first set of process parameters. The method also comprises simulating the step of flowing the gas within the chamber based on the value of the flow characteristic of the gas at the predetermined point in the laser focal plane so that a value of a simulated-flow characteristic of the gas at a predetermined point away from the laser focal plane is identified. The method further comprises comparing the value of the simulated-flow characteristic of the gas at the predetermined point away from the laser focal plane to a desired value of the simulated-flow characteristic. The method additionally comprises flowing the gas within the chamber in accordance with a second set of process parameters, different from the first set of process parameters, when a difference between the value of the simulated-flow characteristic of the gas at the predetermined point away from the laser focal plane and the desired value of the simulated-flow characteristic is outside of a predetermined range.

Simulating the step of flowing the gas within the chamber based on the value of flow characteristic of the gas at the predetermined point in the laser focal plane can be used instead of additively manufacturing test coupon (e.g., to expedite the system qualification) or in addition to additively manufacturing the test coupon (e.g., to provide additional feedback). The value of flow characteristic of the gas is used as an input to this simulation. For example, the flow characteristic of the gas can be a linear speed of the gas as the gas flows through the chamber. This value depends on the first set of process parameters used to flow the gas within the chamber. As such, any changes to these process parameters can result in changes to the value of simulated-flow characteristic of the gas at the predetermined point away from the laser focal plane. This feedback is used to determine the process parameters that yield the desired value of the simulated-flow characteristic, e.g., the one within the predetermined range. Process parameters can be changed (e.g., from the first set of process parameters to the second set of process parameters) until the difference between the value of the simulated-flow characteristic and the desired value of the physical property is within the predetermined range.

Further disclosed herein is a method of monitoring the operation of an additive-manufacturing machine that comprises a chamber, a platform, movable inside the chamber and comprising a build-plane surface, and a laser, having a laser focal plane within the chamber. The method comprises flowing a gas within the chamber in accordance with a first set of process parameters and identifying a value of a flow characteristic of the gas at a predetermined point in the laser focal plane while flowing the gas within the chamber in accordance with the first set of process parameters. The method further comprises comparing the value of the flow characteristic of the gas at the predetermined point in the laser focal plane to a desired value of the flow characteristic to determine a difference therebetween. The method also comprises additively manufacturing a part using the laser while flowing the gas within the chamber in accordance with the first set of process parameters only when the difference between the value of the flow characteristic of the gas at the predetermined point in the laser focal plane and the desired value of the flow characteristic is within a predetermined range.

The desired value of flow characteristics can be used as a direct reference to determine if the additive-manufacturing machine is ready for manufacturing the part. This direct reference eliminates the need for additively manufacturing test coupons and testing these coupons thereafter. Furthermore, this direct reference eliminates the need for simulations and computational-fluid-dynamics analysis. For example, the desired value of flow characteristic can be established previously during validation and/or qualification of the additive-manufacturing machine.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
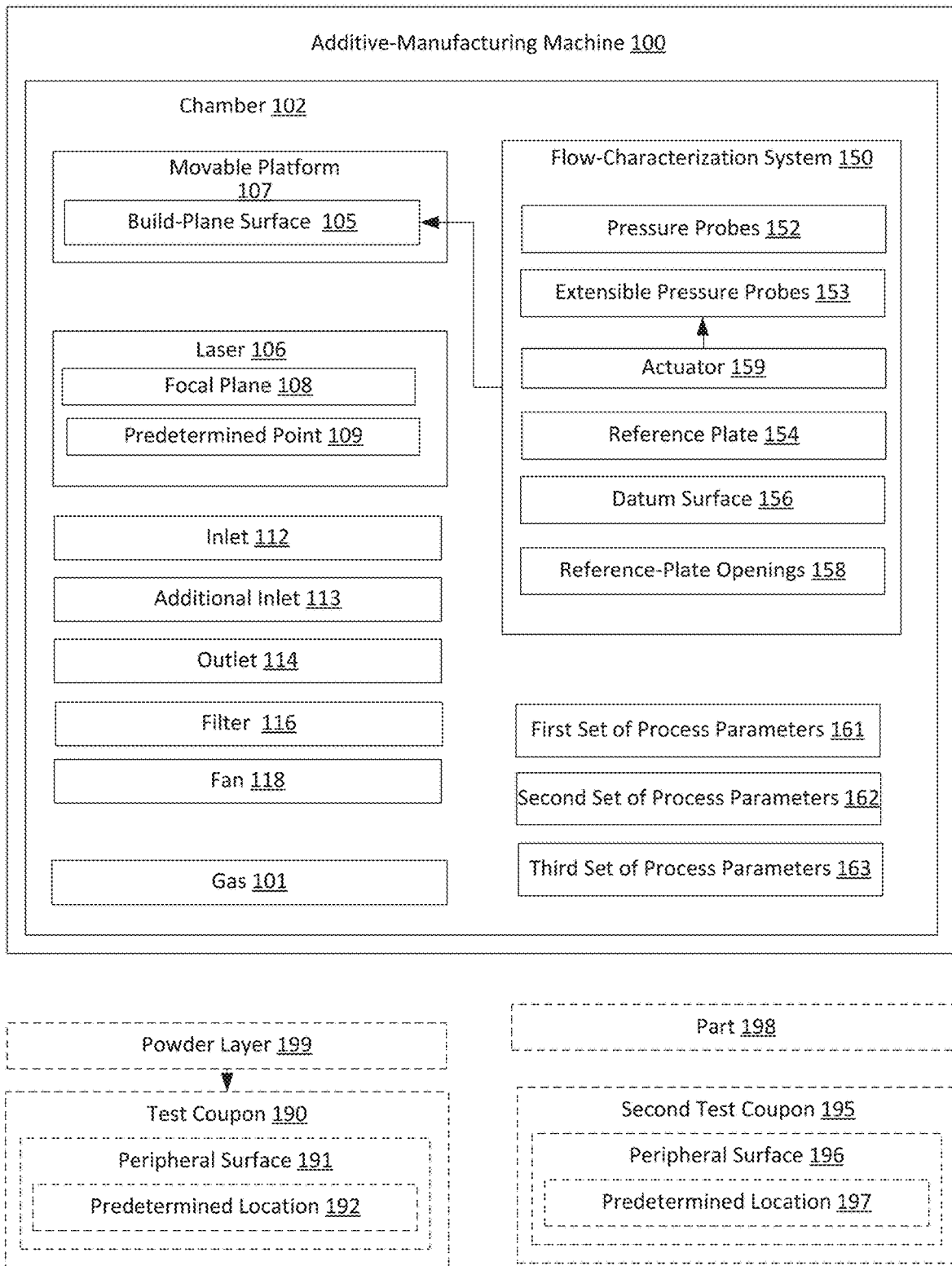
FIG. 1 is a block diagram of an additive-manufacturing machine, according to one or more examples of the subject matter, disclosed herein.

In FIG. 1, referred to above, solid lines, if any, connecting various elements and/or components may represent mechanical, electrical, fluid, optical, electromagnetic, and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having the potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Figure 2A:
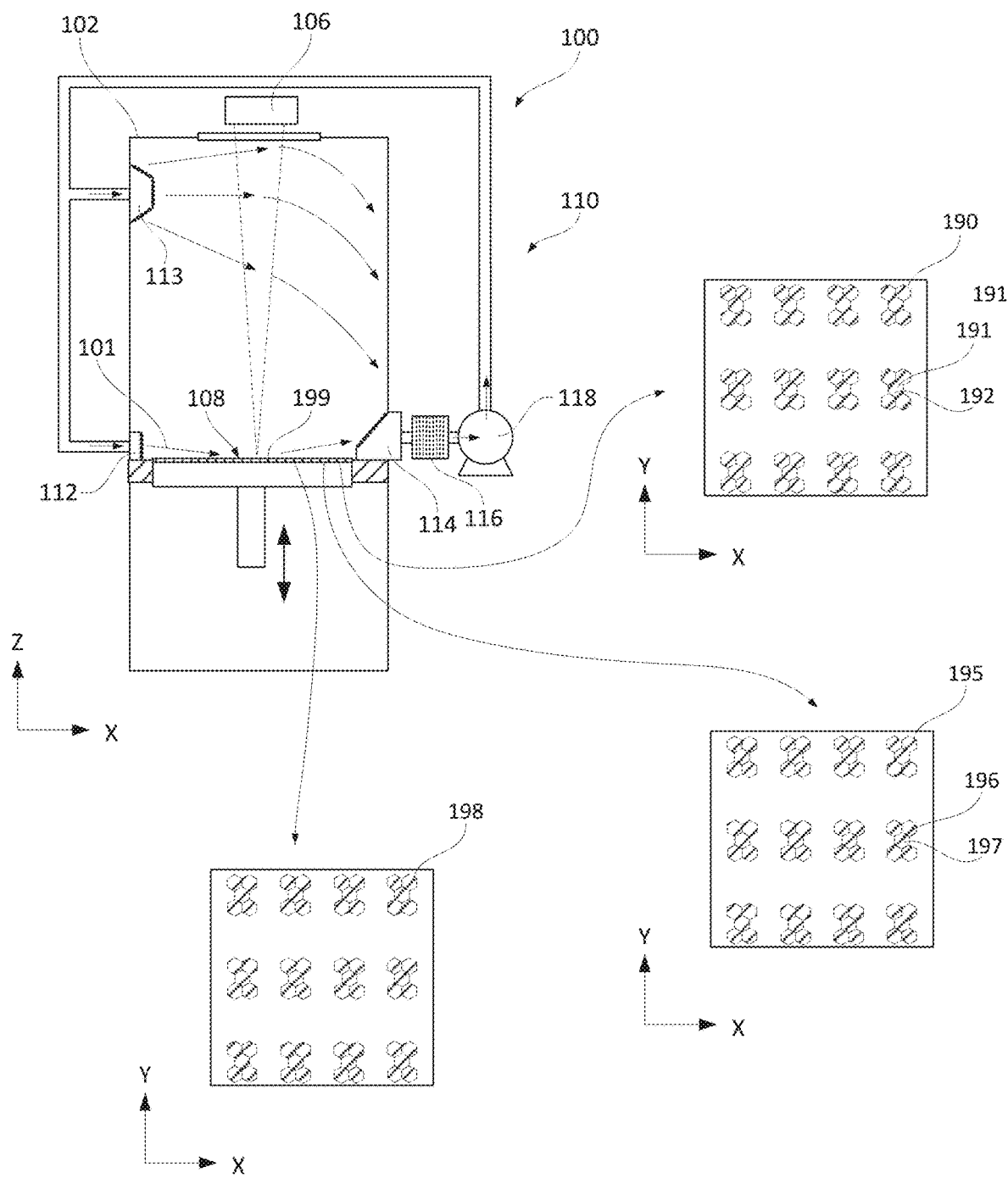
FIG. 2A is a schematic side cross-sectional view of the additive-manufacturing machine of FIG. 1 while additively manufacturing a test coupon or part, according to one or more examples of the subject matter, disclosed herein.
Figure 2B:
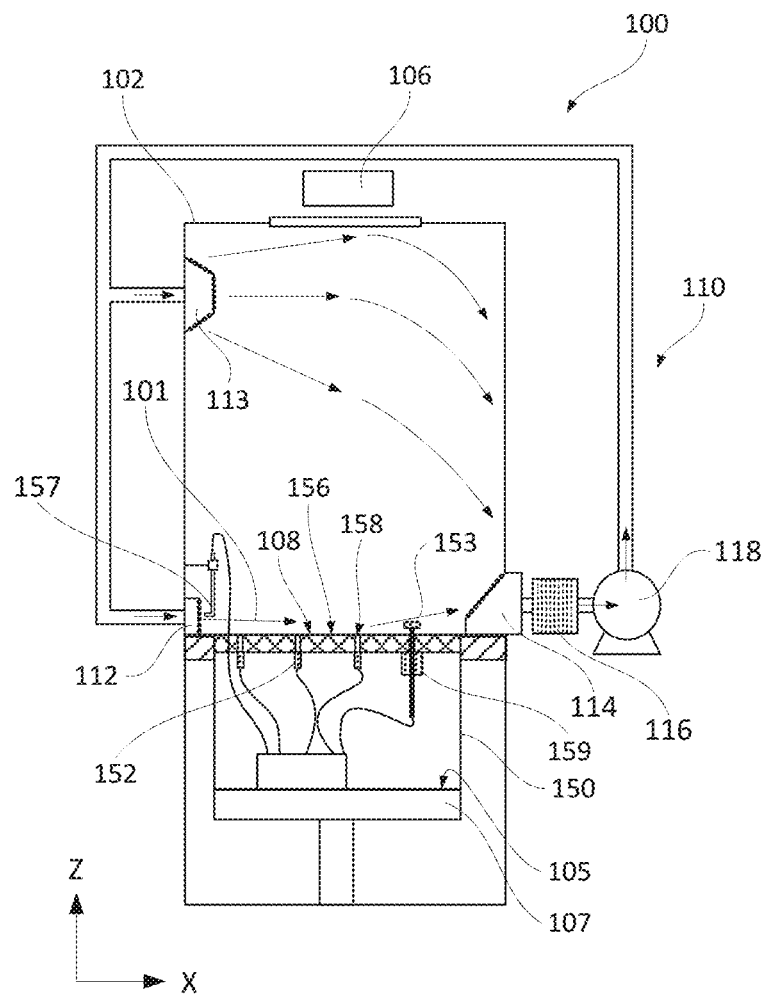
FIG. 2B is a schematic side cross-sectional view of the additive-manufacturing machine of FIG. 1 while identifying the flow characteristic of the gas, flowing through the chamber of the additive-manufacturing machine, according to one or more examples of the subject matter, disclosed herein.
Figure 3A:
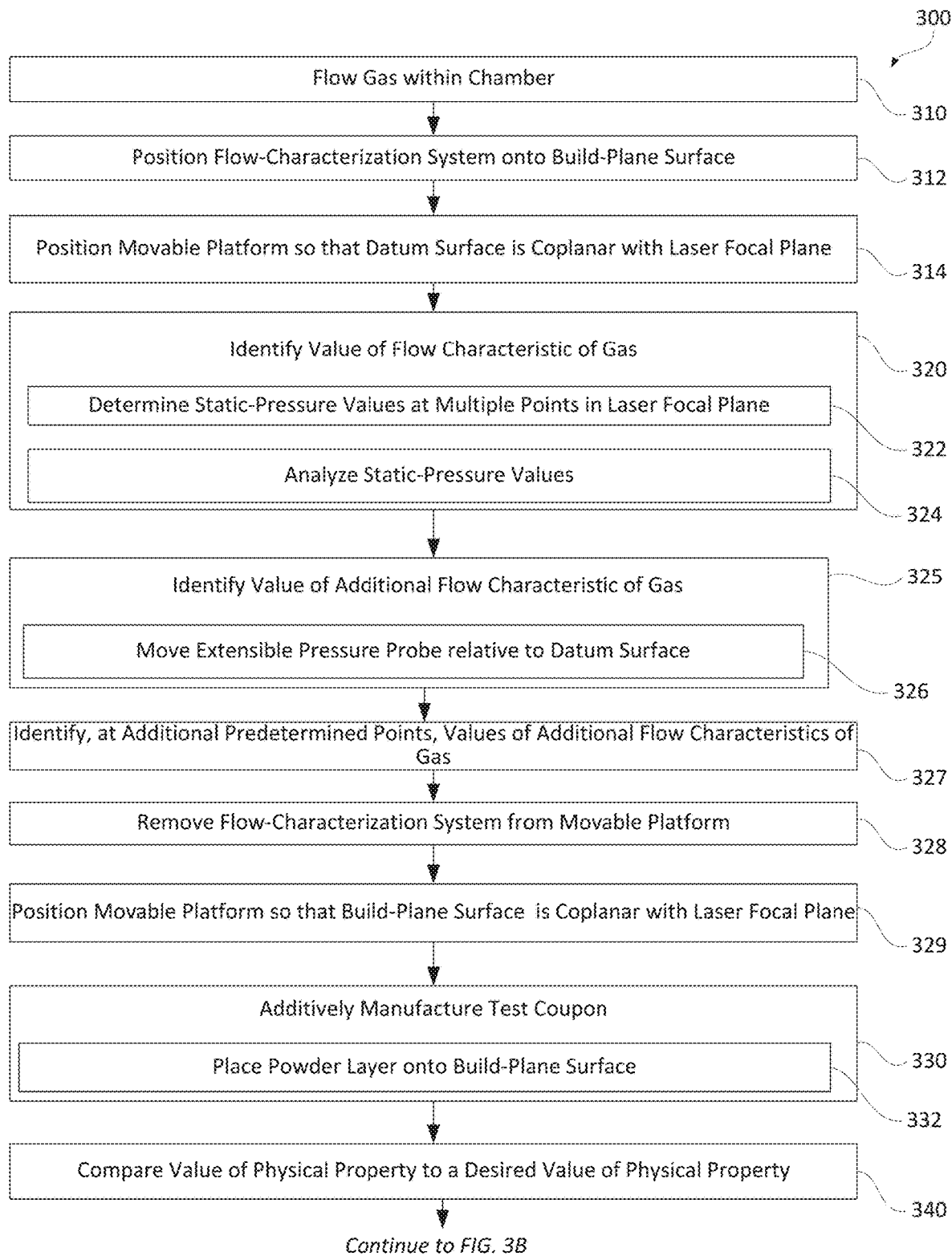
FIGS. 3A, 3B, 4, and 5 are process flowcharts, corresponding to methods of configuring the additive-manufacturing machine of FIG. 1, according to one or more examples of the subject matter, disclosed herein.
Figure 3B:
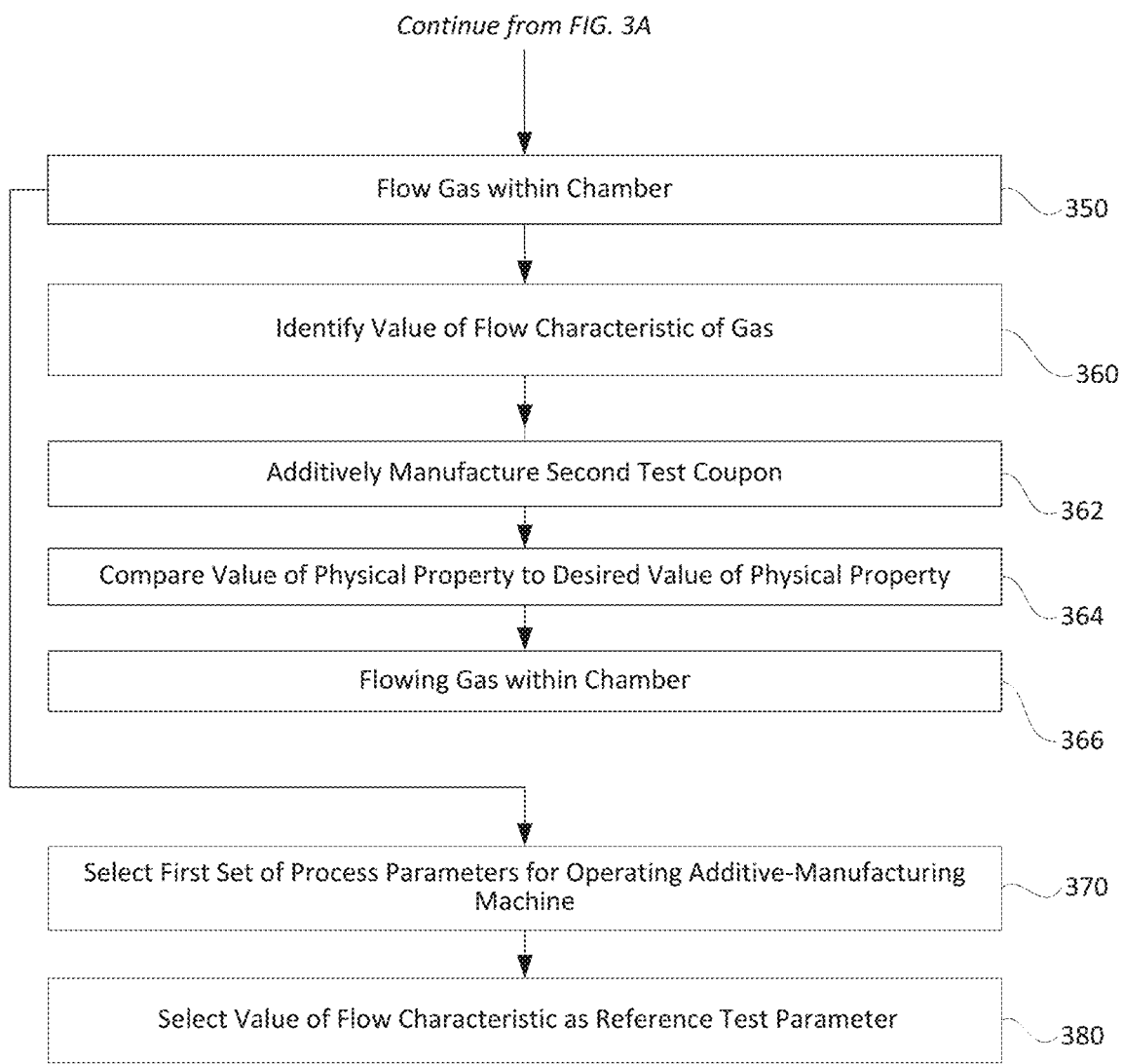

Referring generally to FIGS. 1, 3A, and 3B and particularly to, e.g., FIGS. 2A and 2B for illustrative purposes only and not by way of limitation, the following portion of this paragraph delineates example 1 of the subject matter, disclosed herein. According to example 1, method 300 of configuring additive-manufacturing machine 100 that comprises chamber 102, platform 107, movable inside chamber 102 and comprising build-plane surface 105, and laser 106, having laser focal plane 108 within chamber 102, is described. Method 300 comprises steps of (block 310) flowing gas 101 within chamber 102 in accordance with first set of process parameters 161 and identifying a value of a flow characteristic of gas 101 at predetermined point 109 in laser focal plane 108 while (block 320) flowing gas 101 within chamber 102 in accordance with first set of process parameters 161. Method 300 further comprises a step of (block 330) additively manufacturing test coupon 190 using laser 106 while flowing gas 101 within chamber 102 in accordance with first set of process parameters 161. Test coupon 190 has test-coupon peripheral surface 191. Method 300 further comprises a step of (block 340) comparing a value of the physical property at predetermined location 192 on or underneath test-coupon peripheral surface 191 to a desired value of the physical property. Method 300 also comprises a step of (block 350) flowing gas 101 within chamber 102 in accordance with second set of process parameters 162, different from first set of process parameters 161, when a difference between the value of the physical property at predetermined location 192 on or underneath test-coupon peripheral surface 191 and the desired value of the physical property is outside of a predetermined range.

The value of the physical property at predetermined location 192 on or underneath test-coupon peripheral surface 191 indicates whether additive-manufacturing machine 100 can be used for manufacturing actual production parts, e.g., when the difference (between the value of the physical property at predetermined location 192 on or underneath test-coupon peripheral surface 191 and the desired value of the physical property) is within the predetermined range. In other words, the value (of the physical property at predetermined location 192 on or underneath test-coupon peripheral surface 191) indicates the expected properties of these manufactured parts. At the same time, this value depends on the process parameters, used for additive manufacturing of test coupon 190. Specifically, this value depends on first set of process parameters 161 used to flow gas 101 within chamber 102. As such, any changes to these process parameters can change the value of the physical property at predetermined location 192 on or underneath test-coupon peripheral surface 191. This feedback is used to determine process parameters that yield the desired value of the physical property, e.g., the one within the predetermined range. During this process of configuring additive-manufacturing machine 100, process parameters can be changed (e.g., from first set of process parameters 161 to second set of process parameters 162) until the difference between the value of the physical property at predetermined location 192 on or underneath test-coupon peripheral surface 191 and the desired value of the physical property is within the predetermined range.

Various examples of test coupon 190 are contemplated. For example, test coupon 190 can have a narrow neck (e.g., having a so-called "dog-bone" shape) when test coupon 190 is subjected to a tensile test. Test coupon 190 can be formed from various materials, such as metal, plastic, and/or ceramics. Test coupon 190 is formed, e.g., by selectively sintering a powder layer, positioned at laser focal plane 108 within chamber 102. Specifically, laser 106 produces a laser beam, which is directed to the powder layer. Gas 101 is flown within chamber 102 (e.g., in accordance with first set of process parameters 161 or second set of process parameters 162) to remove fumes and ensure that the laser path (e.g., between laser 106 and laser focal plane 108) is unobstructed. As such, these process parameters can impact the sintering process and the properties of test coupon 190 by removing the fumes from the laser path.

Gas 101 is flown using various components of additive-manufacturing machine 100 as, e.g., is shown in FIG. 2A. For example, fan 118 directs gas 101 to inlet 112 and additional inlet 113, through which gas 101 enters chamber 102. Gas 101 passes through chamber 102 and exits through outlet 114. In some examples, gas 101 is passed through filter 116 to remove any contaminants before being returned back into chamber 102. This recirculation of gas 101 through chamber 102 removes contaminants and helps to keep the laser path unobstructed. The effectiveness of this gas recirculation process depends on the flow characteristic of gas 101. The flow characteristic is identified at one or more specific locations within chamber 102, such as predetermined point 109 in laser focal plane 108 while flowing gas 101 within chamber 102. Furthermore, the flow characteristic of gas 101 or, more specifically, the value of the flow characteristic of gas 101 depends on the process parameters (e.g., first set of process parameters 161) within chamber 102.

Referring generally to FIGS. 1, 3A, and 3B and particularly to, e.g., FIG. 2A for illustrative purposes only and not by way of limitation, the following portion of this paragraph delineates example 2 of the subject matter, disclosed herein. According to example 2, which encompasses example 1, above, each of first set of process parameters 161 and second set of process parameters 162 comprises at least one of a fan speed, a filter type, or an orientation of a flow curtain within chamber 102.

The flow characteristic of gas 101 or, more specifically, the value of the flow characteristic of gas 101 depends on the process parameters (e.g., first set of process parameters 161, second set of process parameters 162) within chamber 102. At the same time, the flow characteristic of gas 101 has an impact on the physical properties of test coupon 190 or, more specifically, the physical property at predetermined location 192 on or underneath test-coupon peripheral surface 191. As such, these process parameters have an impact on the physical property at predetermined location 192 on or underneath test-coupon peripheral surface 191. Controlling each of these process parameters helps to achieve the desired physical property, e.g., when the difference between the value of the physical property at predetermined location 192 on or underneath test-coupon peripheral surface 191 and the desired value of the physical property is within the predetermined range.

For example, a higher fan speed increases the speed, at which gas 101 is flown within chamber 102, and can help with faster and more efficient removing contaminants from chamber 102. A higher fan speed can be used, e.g., when the contamination level within chamber 102 is otherwise high and interferes with the laser beam, as the laser beam passes from laser 106 to laser focal plane 108. However, excessive fan speeds can cause turbulence, vortexes, and other undesirable phenomena, which can be captured as the flow characteristic of gas 101. A filter type also impacts the speed, at which gas 101 can be flown within chamber 102, e.g., how much restriction to the gas flow is presented by filter 116. However, a filter type also determines the amount and the type of contaminants, removed from gas 101 before gas 101 is reintroduced into chamber 102. In some examples, one or more flow curtains are used within chamber 102 to redirect gas 110 within chamber 102, in addition to the initial direction, provided by the inlets.

Figure 2C:
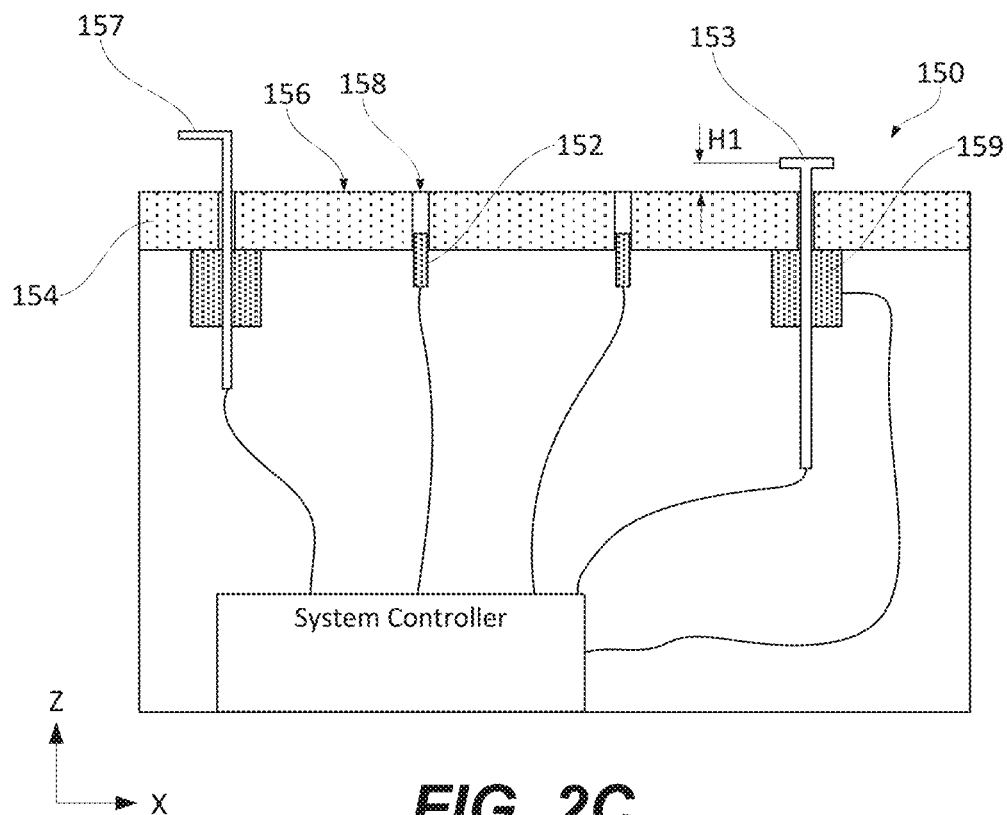
FIGS. 2C and 2D are schematic side cross-sectional views of a flow-characterization system for identifying the flow characteristic of the gas flowing through the chamber of the additive-manufacturing machine of FIG. 1, illustrating different positions of an extensible pressure probe, according to one or more examples of the subject matter, disclosed herein.
Figure 2D:
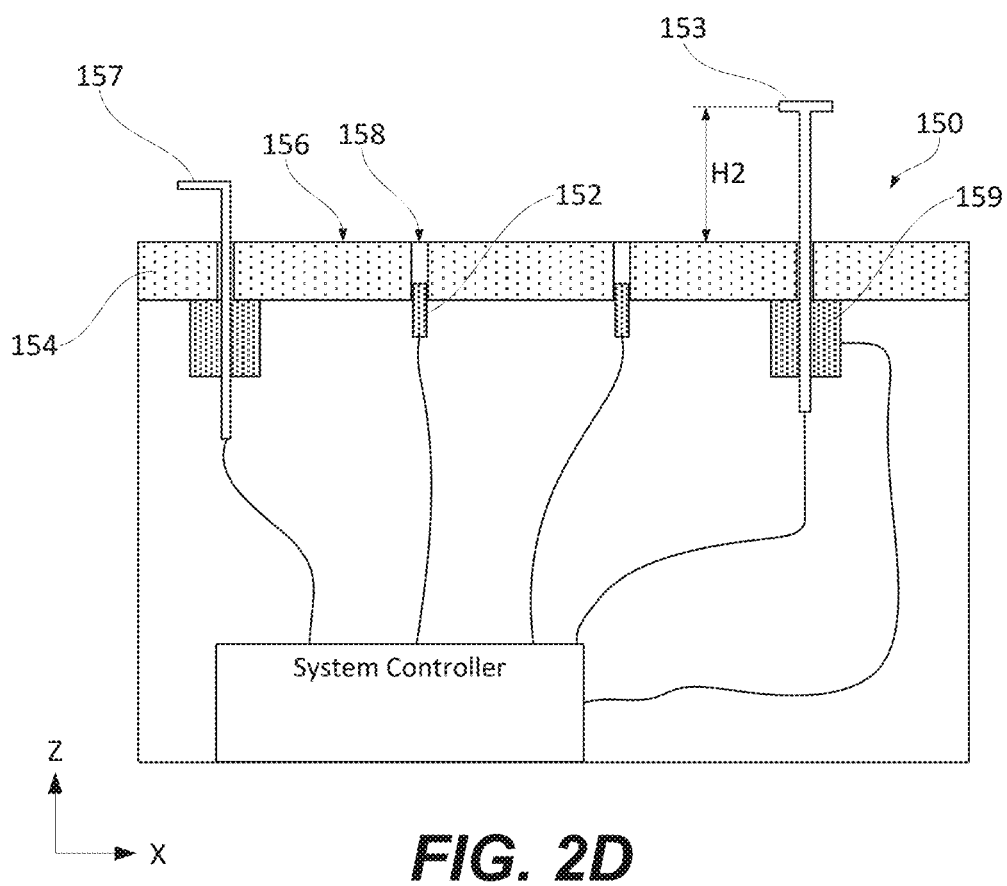
Figure 2E:
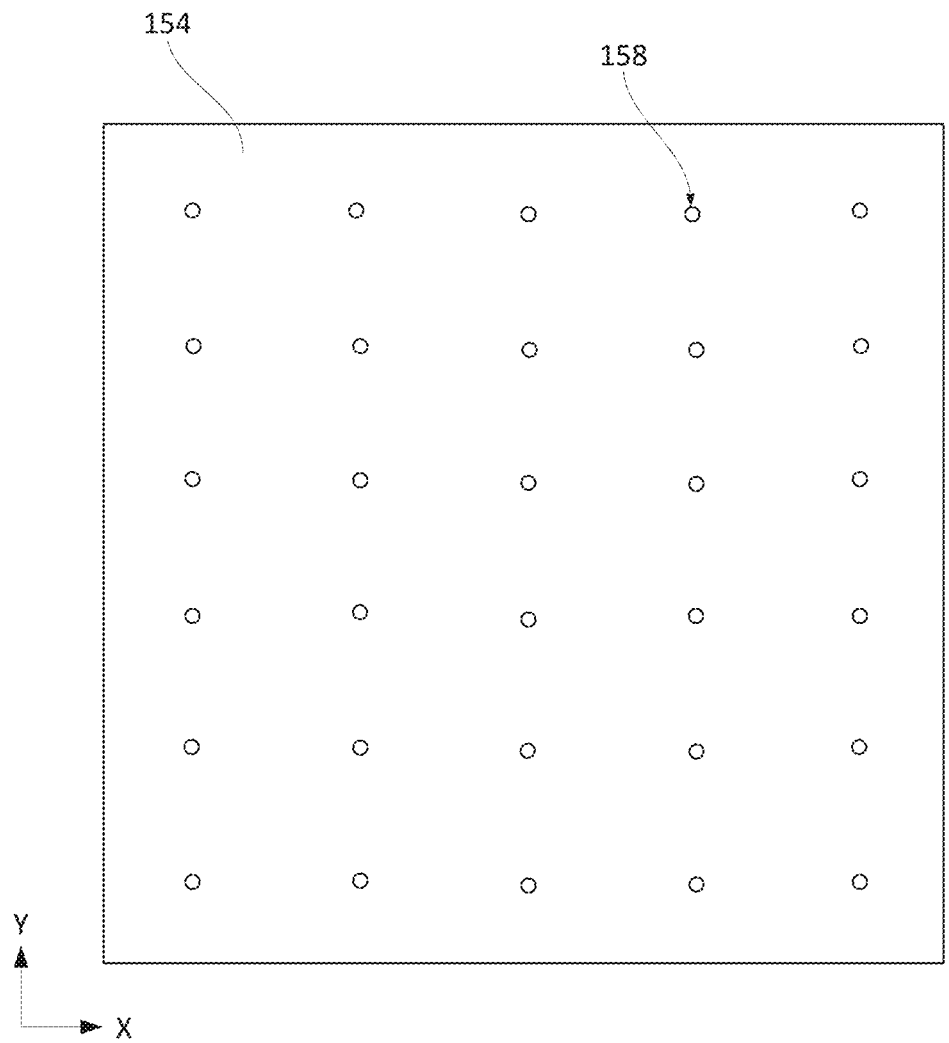
FIG. 2E is a schematic side cross-sectional view of the flow-characterization system of FIGS. 2C and 2D, illustrating reference-plate openings, according to one or more examples of the subject matter, disclosed herein.

Referring generally to FIGS. 1, 3A, and 3B and particularly to, e.g., FIGS. 2B, 2C, and 2E for illustrative purposes only and not by way of limitation, the following portion of this paragraph delineates example 3 of the subject matter, disclosed herein. According to example 3, which encompasses example 1 or 2, above, the step of (block 320) identifying the value of flow characteristic of gas 101 at the predetermined point in laser focal plane 108 comprises (block 322) determining static-pressure values at multiple points in laser focal plane 108 and (block 324) analyzing the static-pressure values to determine the value of flow characteristic of gas 101 at predetermined point 109 in laser focal plane 108.

The static-pressure values at multiple points in laser focal plane 108 are representative of the various flow characteristics of gas 101, such as the direction of gas 101 in chamber 102 and the speed, at which gas 101 travels through chamber 102. For example, the static-pressure difference between two points can be used for these purposes. The locations of these points determine which flow characteristics of gas 101 can be identified.

FIG. 2E illustrates multiple points (identified as reference-plate openings 158 in reference plate 154 of flow-characterization system 150). In some examples, the difference or, more generally, the variations of the static-pressure values among different points in laser focal plane 108 can be used to determine the value of flow characteristic of gas 101 at predetermined point 109 in laser focal plane 108. For example, two points, positioned along the X-axis, can have different static-pressure values. This difference can be correlated to the gas flow along the X-axis. In some examples, predetermined point 109 in laser focal plane 108 coincides with one of the multiple points in laser focal plane 108, at which the static-pressure values are identified. Alternatively, predetermined point 109 in laser focal plane 108 is positioned between two or more of the multiple points in laser focal plane 108.

Referring generally to FIGS. 1, 3A, and 3B and particularly to, e.g., FIGS. 2A and 2B for illustrative purposes only and not by way of limitation, the following portion of this paragraph delineates example 4 of the subject matter, disclosed herein. According to example 4, which encompasses example 3, above, the static-pressure values at the multiple points in laser focal plane 108 within chamber 102 are determined using computational-fluid-dynamics analysis.

Computational-fluid-dynamics analysis enables the static-pressure values at the multiple points in laser focal plane 108 within chamber 102 to be determined without performing an actual test and using any test probe, thereby saving time and eliminating the need for test equipment.

In some examples, computational-fluid-dynamics analysis enables the static-pressure values to be determined at any location in laser focal plane 108 within chamber 102. Furthermore, in some examples, computational-fluid-dynamics analysis enables these locations to be changed as needed, e.g., to provide a more specific correlation to the value of the physical property at predetermined location 192 on or underneath test-coupon peripheral surface 191.

Referring generally to FIGS. 1, 3A, and 3B and particularly to, e.g., FIGS. 2A and 2B for illustrative purposes only and not by way of limitation, the following portion of this paragraph delineates example 5 of the subject matter, disclosed herein. According to example 5, which encompasses any one of examples 1 to 4, above, the flow characteristic of gas 101 is a linear flowrate of gas 101 at predetermined point 109 in laser focal plane 108.

The linear flowrate of gas 101 at predetermined point 109 in laser focal plane 108 is an indication of how fast contaminants are being removed from chamber 102. Furthermore, the linear flowrate of gas 101 can impact thermal conditions during sintering, e.g., a higher flowrate, corresponding to more cooling. It should be noted that laser focal plane 108 is where the sintering occurs during additive manufacturing.

In some examples, multiple linear flowrates of gas 101 are measured within chamber 102, e.g., flowrates in different directions at predetermined point 109 in laser focal plane 108 or flowrates at different points, e.g., within laser focal plane 108 and/or away from laser focal plane 108.

Referring generally to FIGS. 1 and 3 and particularly to, e.g., FIG. 2B for illustrative purposes only and not by way of limitation, the following portion of this paragraph delineates example 6 of the subject matter, disclosed herein. According to example 6, which encompasses any one of examples 1 to 5, laser 106 is not operational during the step of (block 320) identifying the value of flow characteristic of gas 101.

With laser 106 not being operational, various metrology tools can be positioned within chamber 102 to determine the flow characteristic of gas 101 and without any risk of being damaged by laser 106. For example, flow-characterization system 150 can be placed on platform 107 of additive-manufacturing machine 100 to determine the flow characteristic of gas 101. It should be noted that platform 107 is in the direct line of sight of laser 106.

The operation of laser 106 does not impact the flow characteristic of gas 101 within chamber 102. As such, the value of the flow characteristic of gas 101 at predetermined point 109 in laser focal plane 108 while flowing gas 101 within chamber 102 in accordance with first set of process parameters 161 will be the same when laser 106 is operational and when laser 106 is not operational.

Referring generally to FIGS. 1, 3A, and 3B and particularly to) e.g., FIGS. 2B-2E for illustrative purposes only and not by way of limitation, the following portion of this paragraph delineates example 7 of the subject matter, disclosed herein. According to example 7, which encompasses any one of examples 1 to 6, the step of (block 320) identifying the value of flow characteristic of gas 101 at the predetermined point in laser focal plane 108 is performed using flow-characterization system 150, comprising pressure probes 152 and reference plate 154 that comprises datum surface 156 and reference-plate openings 158, passing through datum surface 156. Datum surface 156 is coplanar with laser focal plane 108 during the step of (block 320) identifying the value of flow characteristic of gas 101. Each of pressure probes 152 is received by a respective one of reference-plate openings 158 and is configured to monitor static pressure at datum surface 156 of reference plate 154.

Flow-characterization system 150 is specifically configured for identifying the value of flow characteristic of gas 101 at the predetermined point in laser focal plane 108. The predetermined point in laser focal plane 108 is determined by the position of reference-plate openings 158 or, more specifically, by pressure probes 152, positioned in reference-plate openings 158. Pressure probes 152 obtain various characteristics, which are combined to identify the value of flow characteristic of gas 101 at the predetermined point in laser focal plane 108.

Flow-characterization system 150 is positioned on platform 107 when laser 106 is not operational. As such, flow-characterization system 150 is not damaged by laser 106 while identifying the value of flow characteristic of gas 101 at the predetermined point in laser focal plane 108. Flow-characterization system 150 comprises pressure probes 152 for determining, e.g., static pressure at multiple locations. Flow-characterization system 150 also comprises reference plate 154 that comprises datum surface 156 and reference-plate openings 158, passing through datum surface 156. Datum surface 156 is coplanar with laser focal plane 108 while identifying the value of flow characteristic of gas 101. This positioning ensures that the flow characteristic of gas 101 is determined at the predetermined point in laser focal plane 108 (and not away from laser focal plane 108). Each of pressure probes 152 is received by a respective one of reference-plate openings 158. In other words, reference-plate openings 158 determine the locations of pressure probes 152. Referring to FIG. 2C, in some examples, pressure probes 152 are positioned below datum surface 156 to ensure that the static pressure (at datum surface 156 of reference plate 154) is accurately measured and not impacted by the flow of gas 101 above datum surface 156.

Referring generally to FIGS. 1, 3A, and 3B and particularly to, e.g., FIG. 2B for illustrative purposes only and not by way of limitation, the following portion of this paragraph delineates example 8 of the subject matter, disclosed herein. According to example 8, which encompasses example 7, above, method 300 further comprises, prior to the step of (block 320) identifying the value of the flow characteristic of gas 101 at predetermined point 109 in laser focal plane 108, (block 312) positioning flow-characterization system 150 onto build-plane surface 105 of platform 107. Method 300 also comprises (block 314) positioning platform 107 so that datum surface 156 of reference plate 154 of flow-characterization system 150 is coplanar with laser focal plane 108.

Platform 107 provides the alignment of datum surface 156, relative to laser focal plane 108 or, more specifically, ensures that datum surface 156 is coplanar with laser focal plane 108. This alignment ensures that the flow characteristic of gas 101 is determined at the predetermined point in laser focal plane 108 (and not away from laser focal plane 108).

For example, flow-characterization system 150 has a height (extending in the Z-direction). This height ensures that various external components of flow-characterization system 150 can be arranged and, if needed, accessed (e.g., while servicing flow-characterization system 150). Before positioning flow-characterization system 150, platform 107 can be positioned such that a powder layer is at laser focal plane 108. However, this powder layer can be much thinner/shorter than flow-characterization system 150. As such, if flow-characterization system 150 is positioned on platform 107 without adjusting the height of platform 107, then datum surface 156 will be above laser focal plane 108. Taking measurements at this location (above laser focal plane 108) are not useful, at least for some application.

Platform 107 is therefore lowered until datum surface 156 is coplanar with laser focal plane 108. Referring generally to FIGS. 1, 3A, and 3B and particularly to, e.g., FIG. 2B for illustrative purposes only and not by way of limitation, the following portion of this paragraph delineates example 9 of the subject matter, disclosed herein. According to example 9, which encompasses example 7 or 8, above, method 300 further comprises, after the step of (block 320) identifying the value of the flow characteristic of gas 101 at the predetermined point in laser focal plane 108 and prior to the step of (block 330) additively manufacturing test coupon 190, (block 328) removing flow-characterization system 150 from platform 107 and (block 329) positioning platform 107 so that build-plane surface 105 of platform 107 is coplanar with laser focal plane 108.

Once the value of the flow characteristic of gas 101 is identified, flow-characterization system 150 is removed from platform 107. It should be noted that during the operation of flow-characterization system 150, build-plane surface 105 of platform 107 is below laser focal plane 108, while datum surface 156 of reference plate 154 of flow-characterization system 150 is coplanar with laser focal plane 108. Once the value of the flow characteristic of gas 101 is identified, additive-manufacturing machine 100 needs to be returned to an operational state, in which build-plane surface 105 of platform 107 is coplanar with laser focal plane 108. As such, platform 107 is raised until build-plane surface 105 is coplanar with laser focal plane 108. In this state, build-plane surface 105 of platform 107 is ready to receive a precursor (e.g., powder) for additive manufacturing.

In some examples, platform 107 is equipped with one or more linear actuators used for lowering and raising platform 107. Some examples include, but are not limited to threaded rods, pneumatic cylinders, scotch yokes, and solenoids.

Referring generally to FIGS. 1, 3A, and 3B and particularly to, e.g., FIGS. 2B-2D for illustrative purposes only and not by way of limitation, the following portion of this paragraph delineates example 10 of the subject matter, disclosed herein. According to example 10, which encompasses any one of examples 7 to 9, flow-characterization system 150 further comprises extensible pressure probe 153, protruding above datum surface 156 of reference plate 154. Method 300 further comprises a step of (block 325) identifying a value of an additional flow characteristic of gas 101 at an additional predetermined point, spaced away from laser focal plane 108, using extensible pressure probe 153.

The value of the additional flow characteristic of gas 101 at the additional predetermined point, spaced away from laser focal plane 108, provides an additional characterization of the gas flow within chamber 102. This value can be used together with the value of the physical property at predetermined location 192 on or underneath test-coupon peripheral surface 191 to provide a more comprehensive view of the gas flow within chamber 102.

For example, the value of the additional flow characteristic of gas 101 at the additional predetermined point can be compared with the value of the flow characteristic of gas 101 at predetermined point 109, e.g., to determine any variations of the flow characteristic along the Z-axis of chamber 102. It should be noted that the laser beam travels from laser 106 to focal plane 108 along the Z-axis of chamber 102. As such, the value of the additional flow characteristic of gas 101 at the additional predetermined point provides additional input.

Extensible pressure probe 153 can be supported using reference plate 154 as, e.g., is shown in FIGS. 2C and 2D, or a wall of chamber 102 as, e.g., is shown in FIG. 2B. In some examples, inlet probe 157 is used to identify the value of the additional flow characteristic of gas 101 at the additional predetermined point, spaced away from laser focal plane 108. This additional predetermined point can be positioned at one of the chamber inlets as, e.g., is schematically shown in FIG. 2B.

Referring generally to FIGS. 1, 3A, and 3B and particularly to) e.g., FIGS. 2B-2D for illustrative purposes only and not by way of limitation, the following portion of this paragraph delineates example 11 of the subject matter, disclosed herein. According to example 11, which encompasses example 10, above, the step of (block 325) identifying the value of the additional flow characteristic of gas 101 at the additional predetermined point, spaced away from laser focal plane 108, using extensible pressure probe 153 and the step of (block 320) identifying the value of the flow characteristic of gas 101 at predetermined point 109 in laser focal plane 108 overlap in time.

A combination of the additional flow characteristic of gas 101 at the additional predetermined point and the flow characteristic of gas 101 at predetermined point 109 provide a more comprehensive analysis of the flow conditions within chamber 102 than either one of these flow characteristics on its own. The cumulative effect is achieved when the corresponding values of these flow characteristics are obtained within the same timeframe. In other words, both values characterize the same gas flow condition within the chamber.

For example, identifying the value of the additional flow characteristic of gas 101 at the additional predetermined point and identifying the value of the flow characteristic of gas 101 at predetermined point 109 can start and end at the same time. In other examples, the start time and/or end time can be different. In other words, these two identification operations are staggered in time.

Referring generally to FIGS. 1, 3A, and 3B and particularly to, e.g., FIGS. 2B-2D for illustrative purposes only and not by way of limitation, the following portion of this paragraph delineates example 12 of the subject matter, disclosed herein. According to example 12, which encompasses example 11, above, flow-characterization system 150 further comprises actuator 159, coupled to extensible pressure probe 153. The step of (block 325) identifying the value of the additional flow characteristic of gas 101 at the additional predetermined point, spaced away from laser focal plane 108, using extensible pressure probe 153, comprises (block 326) moving extensible pressure probe 153 relative to datum surface 156 of reference plate 154 in a direction, perpendicular to datum surface 156 using actuator 159.

Actuator 159 enables the position of extensible pressure probe 153 to be changed relative to datum surface 156, e.g., as schematically shown in FIGS. 2C and 2O. As such, actuator 159 controls the position of the additional predetermined point relative to datum surface 156. This position can be changed, using actuator 159, to obtain even more values, each corresponding to a different position of the additional predetermined point relative to datum surface 156 of reference plate 154.

Various examples of actuator 159 are contemplated, such as motorized threaded rods, pneumatic cylinders, scotch yokes, and solenoids. Actuator 159 can be positioned within an enclosure of flow-characterization system 150 to prevent interference with the gas flow within chamber 102. For example, actuator 159 can be positioned below datum surface 156, relative to laser 106.

Referring generally to FIGS. 1, 3A, and 3B and particularly to, e.g., FIGS. 2C and 2D for illustrative purposes only and not by way of limitation, the following portion of this paragraph delineates example 13 of the subject matter, disclosed herein. According to example 13, which encompasses example 11 or 12, above, method 300 further comprises a step of (block 327) identifying, at additional predetermined points, values of additional flow characteristics of gas 101. At least one of the additional predetermined points is farther away from laser focal plane 108 than at least another one of the additional predetermined points.

Measuring the flow characteristics of gas 101 at additional points provides additional input, resulting in a more comprehensive analysis of the flow conditions within chamber 102. The laser beam travels from laser 106 to focal plane 108 along the Z-axis of chamber 102. As such, the gas flow at various distances away from laser focal plane 108 can impact the passage of this laser beam. For example, contamination away from laser focal plane 108 can impact the passage of the laser beam to focal plane 108.

In some examples, these additional predetermined points are selected based on the height of chamber 102, vertical positions of the various inlets and outlets into the chamber, the orientation of the inlets, and other factors.

Referring generally to FIGS. 1, 3A, and 3B and particularly to, e.g., FIGS. 2C and 2D for illustrative purposes only and not by way of limitation, the following portion of this paragraph delineates example 14 of the subject matter, disclosed herein. According to example 14, which encompasses example 13, above, the step of (block 327) identifying, at the additional predetermined points, the additional flow characteristics of gas 101 is performed using extensible pressure probe 153.

Extensible pressure probe 153 can change the measurement position relative to datum surface 156 of reference plate 154 and also relative to laser focal plane 108. As such, extensible pressure probe 153 can obtain multiple measurements within chamber 102, which provide a more comprehensive analysis of the flow conditions within chamber 102.

In some examples, these additional predetermined points are selected based on the height of chamber 102, vertical positions of the various inlets and outlets into the chamber, the orientation of the inlets, and other factors.

Referring generally to FIGS. 1, 3A, and 3B and particularly to, e.g., FIGS. 2A and 2B for illustrative purposes only and not by way of limitation, the following portion of this paragraph delineates example 15 of the subject matter, disclosed herein. According to example 15, which encompasses any one of examples 1 to 14, second set of process parameters 162 is determined based on the value of the physical property at predetermined location 192 on or underneath test-coupon peripheral surface 191 and further based on first set of process parameters 161.

Test coupon 190 or, more specifically, the value of the physical property at predetermined location 192 on or underneath test-coupon peripheral surface 191 is used as feedback for determining second set of process parameters 162. This value indicates how first set of process parameters 161 needs to be adjusted, producing second set of process parameters 162. The adjustment level can depend, for example, on the difference between the value of the physical property at predetermined location 192 on or underneath test-coupon peripheral surface 191 and the desired value of the physical property.

Referring generally to FIGS. 1, 3A, and 3B and particularly to, e.g., FIGS. 2A and 26 for illustrative purposes only and not by way of limitation, the following portion of this paragraph delineates example 16 of the subject matter, disclosed herein. According to example 16, which encompasses any one of examples 1 to 14, second set of process parameters 162 is determined based on the value of the flow characteristic of gas 101 at predetermined point 109 in laser focal plane 108 and further based on the value of the physical property at predetermined location 192 on or underneath test-coupon peripheral surface 191.

The value of the flow characteristic of gas 101 at predetermined point 109 in laser focal plane 108 provides additional feedback for determining second set of process parameters 162. For example, this value can be compared to a reference value of the flow characteristic of gas 101 at predetermined point 109 in laser focal plane 108. The reference value can be obtained during the qualification and validation of additive-manufacturing machine 100.

Referring generally to FIGS. 1, 3A, and 3B and particularly to, e.g., FIGS. 2A and 2B for illustrative purposes only and not by way of limitation, the following portion of this paragraph delineates example 17 of the subject matter, disclosed herein. According to example 17, which encompasses any one of examples 1 to 16, method 300 further comprises a step of (block 360) identifying a value of the flow characteristic of gas 101 at predetermined point 109 in laser focal plane 108 while flowing gas 101 within chamber 102 in accordance with second set of process parameters 162. Method 300 also comprises a step of (block 362) additively manufacturing second test coupon 195 using laser 106 while flowing gas 101 within chamber 102 in accordance with second set of process parameters 162. Second test coupon 195 has second-test-coupon peripheral surface 196. Method 300 additionally comprises a step of (block 364) comparing a value of the physical property at second predetermined location 197 on or underneath second-test-coupon peripheral surface 196 to the desired value of the physical property. Method 300 also comprises a step of (block 366) flowing gas 101 within chamber 102 in accordance with a third set of process parameters 163, different from first set of process parameters 161 and from second set of process parameters 162, when a difference between the value of the physical property at second predetermined location 197 on or underneath second-test-coupon peripheral surface 196 and the desired value of the physical property is outside of the predetermined range.

Second test coupon 195 provides feedback about second set of process parameters 162, which is additional input. Specifically, second test coupon 195 provides feedback if the changes from first set of process parameters 161 (used to additively manufactured test coupon 190) to second set of process parameters 162 (used to additively manufactured second test coupon 195) help to get closer to the desired value of the physical property. Second set of process parameters 162 are selected to improve the value of the physical property at predetermined location 192 on or underneath test-coupon peripheral surface 191, e.g., to get within the desired range or at least close to this range.

In some examples, the desired value is achieved and no further changes to process parameters are needed. In other words, second set of process parameters 162 can be used for additive manufacturing without further testing and configuring additive-manufacturing machine 100. Alternatively, when the desired value is not achieved, the differences between the value of the physical property at second predetermined location 197 on or underneath second-test-coupon peripheral surface 196 and the desired value of the physical property are evaluated for both test coupon 190 and second test coupon 195. For example, this difference can be greater for test coupon 190 than for second test coupon 195. In this case, second set of process parameters 162 is more favorable than first set of process parameters 161. More specifically, the change from first set of process parameters 161 to second set of process parameters 162 was in the right direction. Alternatively, this difference can be smaller for test coupon 190 than for second test coupon 195. In this case, second set of process parameters 162 is less favorable than first set of process parameters 161, and the process can return to first set of process parameters 161 or change in another direction.

In some examples, this process of additively manufacturing test coupons is repeated until the difference between the value of the physical property at second predetermined location 197 on or underneath the peripheral surface of the latest test coupon and the desired value of the physical property is within the predetermined range.

Referring generally to FIGS. 1, 3A, and 3B and particularly to, e.g., FIGS. 2A and 2B for illustrative purposes only and not by way of limitation, the following portion of this paragraph delineates example 18 of the subject matter, disclosed herein. According to example 18, which encompasses any one of examples 1 to 17, method 300 further comprises (block 370) selecting first set of process parameters 161 for operating additive-manufacturing machine 100 when the difference between the value of the physical property at predetermined location 192 on or underneath test-coupon peripheral surface 191 and the desired value of the physical property is within the predetermined range.

The difference between the value of the physical property at predetermined location 192 on or underneath test-coupon peripheral surface 191 and the desired value of the physical property indicates if first set of process parameters 161 (used to additively manufactured test coupon 190) can be used for operating additive-manufacturing machine 100. In other words, the physical property at predetermined location 192 on or underneath test-coupon peripheral surface 191 provides feedback about the process parameters and whether these parameters can be used for operating additive-manufacturing machine 100. When the difference is within the predetermined range for first set of process parameters 161, first set of process parameters 161 can be selected for operating additive-manufacturing machine 100.

It should be noted that, in some examples, the process parameters can be changed one or more times (e.g., from first set of process parameters 161 to second set of process parameters 162, from second set of process parameters 162 to third set of process parameters 163) before the difference between the value of the physical property and the desired value of the physical property is within the predetermined range. Once this difference is within the predetermined range, the latest set of process parameters is used for operating additive-manufacturing machine 100.

Referring generally to FIGS. 1, 3A, and 3B and particularly to, e.g., FIG. 2A for illustrative purposes only and not by way of limitation, the following portion of this paragraph delineates example 19 of the subject matter, disclosed herein. According to example 19, which encompasses example 18, above, method 300 further comprises (block 380) selecting the value of the flow characteristic of gas 101 at the predetermined point in laser focal plane 108 as a reference test parameter for operating additive-manufacturing machine 100.

When the difference between the value of the physical property at predetermined location 192 on or underneath test-coupon peripheral surface 191 and the desired value of the physical property is within the predetermined range for first set of process parameters 161, first set of process parameters 161 can be selected for operating additive-manufacturing machine 100. First set of process parameters 161 are controlled externally and, in some examples, are not able to account for some internal variations of additive-manufacturing machine 100 (e.g., filter cleanness). At the same time, first set of process parameters 161 was previously used to flow gas 101 within chamber 102 and identifying the value of the flow characteristic of gas 101 at the predetermined point in laser focal plane 108. The value of the flow characteristic of gas 101 accounts for various internal variations of additive-manufacturing machine 100 (in addition to changes to first set of process parameters 161). As such, the value of the flow characteristic of gas 101 can be used for internal control and, more generally, as a reference test parameter for operating additive-manufacturing machine 100.

For example, flow-characterization system 150 can be periodically installed into additive-manufacturing machine 100, and gas 101 is flown within chamber 102 in accordance with first set of process parameters 161. Flow-characterization system 150 determined the value of the flow characteristic of gas 101 at the predetermined point in laser focal plane 108 and this value can be compared to the reference test parameter to ensure that no changes to additive-manufacturing machine 100 have occurred and that additive-manufacturing machine 100 can continue to operate.

Referring generally to FIGS. 1, 3A, and 3B and particularly to, e.g., FIG. 2A for illustrative purposes only and not by way of limitation, the following portion of this paragraph delineates example 20 of the subject matter, disclosed herein. According to example 20, which encompasses example 1, above, the step of (block 330) additively manufacturing test coupon 190 comprises (block 332) placing powder layer 199 onto build-plane surface 105 of platform 107 and heating powder layer with laser 106 to locally melt powder layer 199.

When powder layer 199 locally melts and later cools, a monolithic body of test coupon 190 is formed. The local melting is provided by laser 106, which can be focused on any portion of powder layer 199 thereby determining the shape of test coupon 190. This local melting determines the shape of test coupon 190. Portions of powder layer 199 that have not been melted are removed (and rearranged). The process is repeated to build up test coupon 190.

Figure 4:
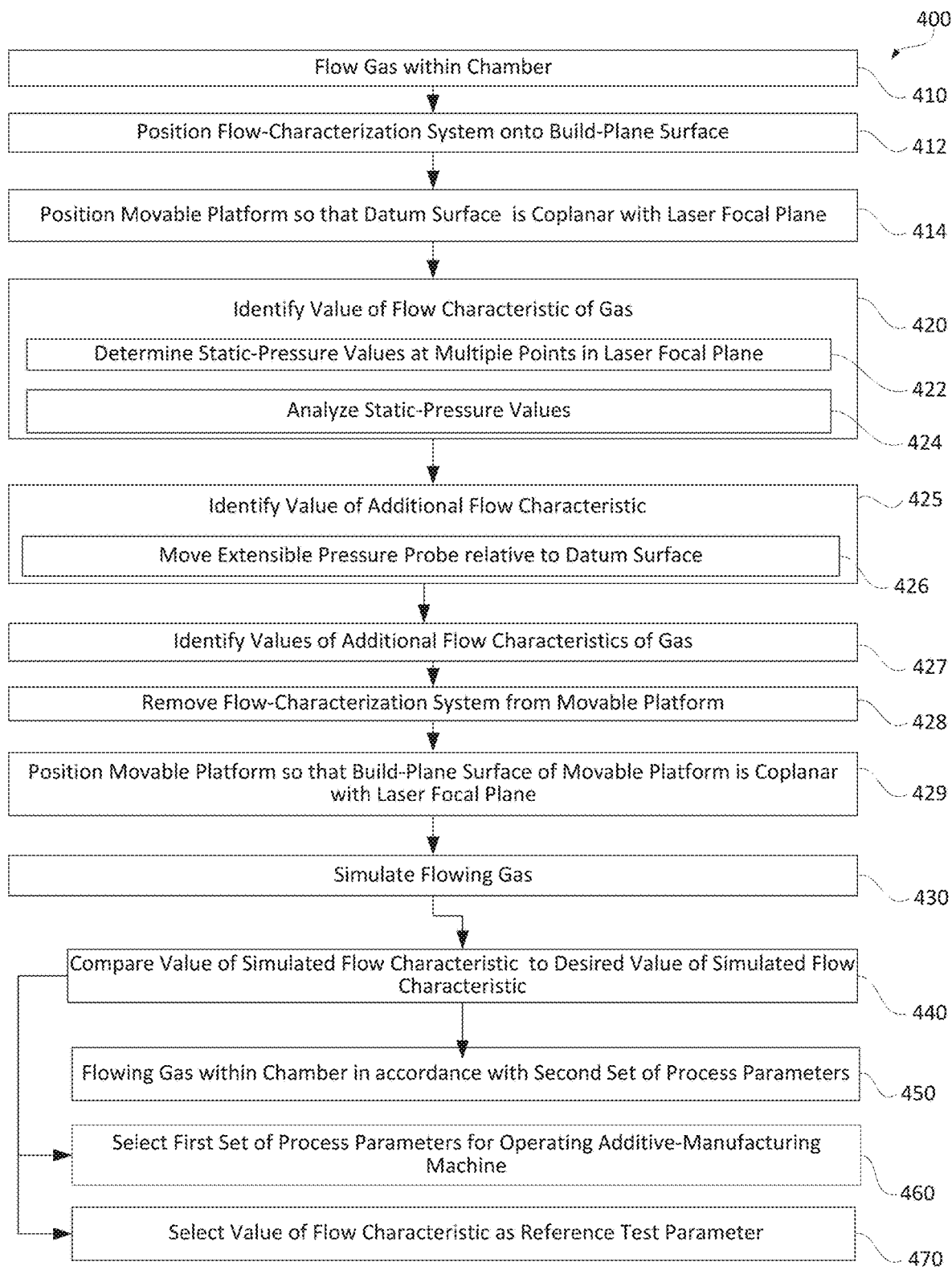

Referring generally to FIGS. 1 and 4 and particularly to, e.g., FIGS. 2B-2E for illustrative purposes only and not by way of limitation, the following portion of this paragraph delineates example 21 of the subject matter, disclosed herein. According to example 21, method 400 of configuring additive-manufacturing machine 100 that comprises chamber 102, platform 107, movable inside chamber 102 and comprising build-plane surface 105, and laser 106, having laser focal plane 108 within chamber 102, is described. Method 400 comprises a step of (block 410) flowing gas 101 within chamber 102 in accordance with first set of process parameters 161. Method 400 also comprises a step of (block 420) identifying a value of a flow characteristic of gas 101 at a predetermined point in laser focal plane 108 while flowing gas 101 within chamber 102 in accordance with first set of process parameters 161. Method 400 further comprises a step of (block 430) simulating the step of flowing gas 101 within chamber 102 based on the value of flow characteristic of gas 101 at the predetermined point in laser focal plane 108 so that a value of a simulated-flow characteristic of gas 101 at a predetermined point away from laser focal plane 108 is identified. Method 400 additionally comprises a step of (block 440) comparing the value of the simulated-flow characteristic of gas 101 at the predetermined point away from laser focal plane 108 to a desired value of simulated-flow characteristic. Method 400 also comprises a step of (block 450) flowing gas 101 within chamber 102 in accordance with second set of process parameters 162, different from first set of process parameters 161, when a difference between the value of the simulated-flow characteristic of gas 101 at the predetermined point away from laser focal plane 108 and the desired value of the simulated-flow characteristic is outside of a predetermined range.

Simulating the step of flowing gas 101 within chamber 102 based on the value of flow characteristic of gas 101 at the predetermined point in laser focal plane 108 can be used instead of additively manufacturing a test coupon (e.g., to expedite the system qualification) or in addition to additively manufacturing a test coupon (e.g., to provide additional feedback). The value of flow characteristic of gas 101 is used as an input to this simulation. For example, the flow characteristic of gas 101 can be a linear speed of gas 101 as gas 101 flows through chamber 102. This value depends on first set of process parameters 161 used to flow gas 101 within chamber 102. As such, any changes to these process parameters can result in changes to the value of simulated-flow characteristic of gas 101. This feedback is used to determine process parameters that yield the desired value of the simulated-flow characteristic, e.g., the one within the predetermined range. Process parameters can be changed (e.g., from first set of process parameters 161 to second set of process parameters 162) until the difference between the value of the simulated-flow characteristic and the desired value of the physical property is within the predetermined range.

Gas 101 is flown using various components of additive-manufacturing machine 100 as, e.g., is shown in FIG. 2B. For example, fan 118 directs gas 101 to inlet 112 and additional inlet 113, through which gas 101 enters chamber 102. Gas 101 passes through chamber 102 and exits through outlet 114. In some examples, gas 101 is passed through filter 116 to remove any contaminants before being returned back into chamber 102. This recirculation of gas 101 through chamber 102 removes contaminants and helps to keep the laser path unobstructed. The effectiveness of this gas recirculation process depends on the flow characteristic of gas 101. The flow characteristic is identified at one or more specific locations within chamber 102, such as predetermined point 109 in laser focal plane 108 while flowing gas 101 within chamber 102. Furthermore, the flow characteristic of gas 101 or, more specifically, the value of the flow characteristic of gas 101, depends on the process parameters (e.g., first set of process parameters 161) within chamber 102.

Referring generally to FIGS. 1 and 4 and particularly to, e.g., FIGS. 2B-2E for illustrative purposes only and not by way of limitation, the following portion of this paragraph delineates example 22 of the subject matter, disclosed herein. According to example 22, which encompasses example 21, above, the step of (block 430) simulating the step of flowing gas 101 within chamber 102 based on the value of the flow characteristic of gas 101 at the predetermined point in laser focal plane 108 within chamber 102 comprises performing computational-fluid-dynamics analysis.

The computational-fluid-dynamics analysis provides a fast and efficient way of determining the value of the simulated-flow characteristic of gas 101 at the predetermined point away from laser focal plane 108. The computational-fluid-dynamics analysis is performed using gas flow characteristics, identified earlier, as inputs (e.g., as a part of boundary conditions). In some examples, a computer-aided design (CAD) of chamber 102 and various components of additive-manufacturing machine 100, which are positioned inside chamber 102, are provided as inputs to the computational-fluid-dynamics analysis. Chamber 102 or, more specifically, the volume, occupied by gas 101, is divided into discrete cells. Boundary conditions are defined using, e.g., the value of the flow characteristic of gas 101 at the predetermined point in laser focal plane 108 within chamber 102. The gas flow can be viewed as a steady-state system, and various fluid dynamics equations are solved iteratively for this system.

Referring generally to FIGS. 1 and 4 and particularly to, e.g., FIGS. 2B-2E for illustrative purposes only and not by way of limitation, the following portion of this paragraph delineates example 23 of the subject matter, disclosed herein. According to example 23, which encompasses example 21 or 22, above, each of first set of process parameters 161 and second set of process parameters 162 comprises at least one of a fan speed, a filter type, or an orientation of a flow curtain within chamber 102.

The flow characteristic of gas 101 or, more specifically, the value of the flow characteristic of gas 101, depends on the process parameters (e.g., first set of process parameters 161, second set of process parameters 162) within chamber 102. At the same time, the flow characteristic of gas 101 has an impact on the physical properties of test coupon 190 or, more specifically, the physical property at predetermined location 192 on or underneath test-coupon peripheral surface 191. As such, these process parameters have an impact on the physical property at predetermined location 192 on or underneath test-coupon peripheral surface 191. Controlling each of these process parameters helps to achieve the desired physical property, e.g., when the difference between the value of the physical property at predetermined location 192 on or underneath test-coupon peripheral surface 191 and the desired value of the physical property is within the predetermined range.

For example, a higher fan speed increases the speed, at which gas 101 is flown within chamber 102, and can help with faster and more efficient removal of contaminants from chamber 102. A higher fan speed can be used, e.g., when the contamination level within chamber 102 is otherwise high and interferes with the laser beam as the laser beam passes from laser 106 to laser focal plane 108. However, excessive fan speeds can cause turbulence, vortexes, and other undesirable phenomena, which can be captured as the flow characteristic of gas 101. A filter type also impacts the speed, at which gas 101 can be flown within chamber 102, e.g., how much restriction to the gas flow is presented by filter 116. However, a filter type also determines the amount and the type of contaminants, removed from gas 101 before gas 101 is reintroduced into chamber 102. In some examples, one or more flow curtains are used within chamber 102 to redirect gas 110 within chamber 102, in addition to the initial direction, provided by the inlets.

Referring generally to FIGS. 1 and 4 and particularly to, e.g., FIGS. 2B-2E for illustrative purposes only and not by way of limitation, the following portion of this paragraph delineates example 24 of the subject matter, disclosed herein. According to example 24, which encompasses any one of examples 21 to 23, above, the step of (block 420) identifying the value of flow characteristic of gas 101 at the predetermined point in laser focal plane 108 comprises (block 422) determining static-pressure values at multiple points in laser focal plane 108 and (block 424) analyzing the static-pressure values to determine the value of flow characteristic of gas 101 at predetermined point 109 in laser focal plane 108.

The static-pressure values at multiple points in laser focal plane 108 are representative of the various flow characteristics of gas 101, such as the direction of gas 101 in chamber 102 and the speed, at which gas 101 travels through chamber 102. For example, the static-pressure difference between two points can be used for these purposes. The locations of these points determine which flow characteristics of gas 101 can be identified.

FIG. 2E illustrates multiple points (identified as reference-plate openings 158 in reference plate 154 of flow-characterization system 150). In some examples, the difference or, more generally, the variations of the static-pressure values among different points in laser focal plane 108 can be used to determine the value of flow characteristic of gas 101 at predetermined point 109 in laser focal plane 108. For example, two points, positioned along the X-axis, can have different static-pressure values. This difference can be correlated to the gas flow along the X-axis. In some examples, predetermined point 109 in laser focal plane 108 coincides with one of the multiple points in laser focal plane 108, at which the static-pressure values are identified. Alternatively, predetermined point 109 in laser focal plane 108 is positioned between two or more of the multiple points in laser focal plane 108.

Referring generally to FIGS. 1 and 4 and particularly to, e.g., FIG. 2B for illustrative purposes only and not by way of limitation, the following portion of this paragraph delineates example 25 of the subject matter, disclosed herein. According to example 25, which encompasses example 24, above, the static-pressure values at the multiple points in laser focal plane 108 within chamber 102 are determined using computational-fluid-dynamics analysis.

Computational-fluid-dynamics analysis enables the static-pressure values at the multiple points in laser focal plane 108 within chamber 102 to be determined without performing an actual test and using any test probes, thereby saving time and eliminating the need for test equipment.

In some examples, computational-fluid-dynamics analysis enables the static-pressure values at any locations in laser focal plane 108 within chamber 102 to be determined. Furthermore, in some examples, computational-fluid-dynamics analysis enables these locations to be changed as needed, e.g., to provide a more specific correlation to the value of the physical property at predetermined location 192 on or underneath test-coupon peripheral surface 191.

Referring generally to FIGS. 1 and 4 and particularly to, e.g., FIGS. 2B-2E for illustrative purposes only and not by way of limitation, the following portion of this paragraph delineates example 26 of the subject matter, disclosed herein. According to example 26, which encompasses any one of examples 21 to 25, above, the flow characteristic of gas 101 is a linear flowrate of gas 101 at predetermined point 109 in laser focal plane 108.

The linear flowrate of gas 101 at predetermined point 109 in laser focal plane 108 is an indication of how fast contaminants are being removed from chamber 102. Furthermore, the linear flowrate of gas 101 can impact thermal conditions during sintering, e.g., a higher flowrate corresponding to more cooling. It should be noted that laser focal plane 108 is where the sintering occurs during additive manufacturing.

In some examples, multiple linear flowrates of gas 101 are measured within chamber 102, e.g., flowrates in different directions at predetermined point 109 in laser focal plane 108 or flowrates at different points, e.g., within laser focal plane 108 and/or away from laser focal plane 108.

Referring generally to FIGS. 1 and 4 and particularly to, e.g., FIGS. 2B-2E for illustrative purposes only and not by way of limitation, the following portion of this paragraph delineates example 27 of the subject matter, disclosed herein. According to example 27, which encompasses any one of examples 21 to 26, above, laser 106 is not operational during the step of (block 420) identifying the value of flow characteristic of gas 101.

With laser 106 not being operational, various metrology tools can be positioned within chamber 102 to determine the flow characteristic of gas 101 and without any risk of being damaged by laser 106. For example, flow-characterization system 150 can be placed on platform 107 of additive-manufacturing machine 100 to determine the flow characteristic of gas 101. It should be noted that platform 107 is in the direct line of sight of laser 106.

The operation of laser 106 does not impact the flow characteristic of gas 101 within chamber 102. As such, the value of the flow characteristic of gas 101 at predetermined point 109 in laser focal plane 108, while flowing the gas 101 within chamber 102 in accordance with first set of process parameters 161, will be the same when laser 106 is operational and when laser 106 is not operational.

Referring generally to FIGS. 1 and 4 and particularly to, e.g., FIGS. 2B-2E for illustrative purposes only and not by way of limitation, the following portion of this paragraph delineates example 28 of the subject matter, disclosed herein. According to example 28, which encompasses any one of examples 21 to 27, above, the step of (block 420) identifying the value of flow characteristic of gas 101 at the predetermined point in laser focal plane 108 is performed using flow-characterization system 150, comprising pressure probes 152 and reference plate 154 that comprises datum surface 156 and reference-plate openings 158, passing through datum surface 156. Datum surface 156 is coplanar with laser focal plane 108 during the step of (block 420) identifying the value of flow characteristic of gas 101. Each of pressure probes 152 is received by a respective one of reference-plate openings 158 and is configured to monitor static pressure at datum surface 156 of reference plate 154.

Flow-characterization system 150 is specifically configured for identifying the value of flow characteristic of gas 101 at the predetermined point in laser focal plane 108. The predetermined point in laser focal plane 108 is determined by the position of reference-plate openings 158 or, more specifically, by pressure probes 152 positioned in reference-plate openings 158. Pressure probes 152 obtained various characteristics which are combined to identify the value of flow characteristic of gas 101 at the predetermined point in laser focal plane 108.

Flow-characterization system 150 is positioned onto platform 107 when laser 106 is not operational. As such, flow-characterization system 150 is not damaged by laser 106 while identifying the value of flow characteristic of gas 101 at the predetermined point in laser focal plane 108. Flow-characterization system 150 comprises pressure probes 152 for determining, e.g., static pressure at multiple locations. Flow-characterization system 150 also comprises reference plate 154 that comprises datum surface 156 and reference-plate openings 158, passing through datum surface 156. Datum surface 156 is coplanar with laser focal plane 108 during the step of identifying the value of flow characteristic of gas 101. This positioning ensures that the flow characteristic of gas 101 is determined at the predetermined point in laser focal plane 108 (and not away from laser focal plane 108). Each of pressure probes 152 is received by a respective one of reference-plate openings 158. In other words, reference-plate openings 158 determine the location of pressure probes 152. Referring to FIG. 2C, in some examples, pressure probes 152 are positioned below datum surface 156 to ensure that the static pressure (at datum surface 156 of reference plate 154) is accurately measured.

Referring generally to FIGS. 1 and 4 and particularly to, e.g., FIG. 2B for illustrative purposes only and not by way of limitation, the following portion of this paragraph delineates example 29 of the subject matter, disclosed herein. According to example 29, which encompasses example 28, above, method 400 further comprises, prior to the step of (block 420) identifying the value of flow characteristic of gas 10:1 at predetermined point 109 in laser focal plane 108, (block 412) positioning flow-characterization system 150 onto build-plane surface 105 of platform 107. Method 400 also comprises (block 414) positioning platform 107 so that datum surface 156 of reference plate 154 of flow-characterization system 150 is coplanar with laser focal plane 108.

Platform 107 provides the alignment of datum surface 156, relative to laser focal plane 108 or, more specifically, ensures that datum surface 156 is coplanar with laser focal plane 108. This alignment ensures that the flow characteristic of gas 101 is determined at the predetermined point in laser focal plane 108 (and not away from laser focal plane 108).

For example, flow-characterization system 150 has a height (extending in the Z-direction). This height ensures that various external components of flow-characterization system 150 can be arranged and, if needed, accessed (e.g., while servicing flow-characterization system 150). Before positioning flow-characterization system 150, platform 107 can be positioned such that a powder layer is at laser focal plane 108. However, this powder layer can be much thinner/shorter than flow-characterization system 150. As such, if flow-characterization system 150 is positioned on platform 107 without adjusting the height of platform 107, then datum surface 156 will be above laser focal plane 108. Taking measurements at this location (above laser focal plane 108) are not useful, at least for some application. Platform 107 is therefore lowered until datum surface 156 is coplanar with laser focal plane 108.

Referring generally to FIGS. 1 and 4 and particularly to, e.g., FIG. 2B for illustrative purposes only and not by way of limitation, the following portion of this paragraph delineates example 30 of the subject matter, disclosed herein. According to example 30, which encompasses example 28 or 29, above, method 400 further comprises, after the step of (block 420) identifying the value of the flow characteristic of gas 101 at the predetermined point in laser focal plane 108, (block 428) removing flow-characterization system 150 from platform 107 and (block 429) positioning platform 107 so that build-plane surface 105 of platform 107 is coplanar with laser focal plane 108.

Once the value of the flow characteristic of gas 101 is identified, flow-characterization system 150 is removed from platform 107. It should be noted that during the operation of flow-characterization system 150, build-plane surface 105 of platform 107 is below laser focal plane 103. Instead, datum surface 156 of reference plate 154 of flow-characterization system 150 is coplanar with laser focal plane 108. Additive-manufacturing machine 100 needs to be returned to an operational state, in which build-plane surface 105 of platform 107 is coplanar with laser focal plane 108, which is achieved by raising platform 107 until build-plane surface 105 is coplanar with laser focal plane 108. In this state, build-plane surface 105 of platform 107 is ready to receive a precursor (e.g., powder) for additive manufacturing.

In some examples, platform 107 is equipped with one or more linear actuators used for lowering and raising platform 107. Some examples include, but are not limited to threaded rods, pneumatic cylinders, scotch yokes, and solenoids.

Referring generally to FIGS. 1 and 4 and particularly to, e.g., FIGS. 2B-2D for illustrative purposes only and not by way of limitation, the following portion of this paragraph delineates example 31 of the subject matter, disclosed herein. According to example 31, which encompasses any one of examples 28 to 30, flow-characterization system 150 further comprises extensible pressure probe 153, protruding above datum surface 156 of reference plate 154. Method 400 further comprises a step of (block 425) identifying a value of an additional flow characteristic of gas 101 at an additional predetermined point, spaced away from laser focal plane 108, using extensible pressure probe 153.

The value of the additional flow characteristic of gas 101 at the additional predetermined point, spaced away from laser focal plane 108, provides an additional characterization of the gas flow within chamber 102. This value can be used together with the value of the physical property at predetermined location 192 on or underneath test-coupon peripheral surface 191 to provide a more comprehensive view of the gas flow within chamber 102.

For example, the value of the additional flow characteristic of gas 101 at the additional predetermined point can be compared with the value of the flow characteristic of gas 101 at predetermined point 109, e.g., to determine any variations of the flow characteristic along the t-axis of chamber 102. It should be noted that the laser beam travels from laser 106 to focal plane 108 along the Z-axis of chamber 102. As such, the value of the additional flow characteristic of gas 101 at the additional predetermined point provides additional input.

Extensible pressure probe 153 can be supported using reference plate 154 as, e.g., is shown in FIGS. 2C and 2D. In some examples, inlet probe 157 is used to identify the value of the additional flow characteristic of gas 101 at the additional predetermined point, spaced away from laser focal plane 108. This additional predetermined point can be positioned at one of the chamber inlets as, e.g., is schematically shown in FIG. 2B.

Referring generally to FIGS. 1 and 4 and particularly to, e.g., FIGS. 2B-2D for illustrative purposes only and not by way of limitation, the following portion of this paragraph delineates example 32 of the subject matter, disclosed herein. According to example 32, which encompasses example 31, above, the step of (block 425) identifying the value of the additional flow characteristic of gas 101 at the additional predetermined point, spaced away from laser focal plane 108, using extensible pressure probe 153, and the step of (block 420) identifying the value of the flow characteristic of gas 101 at predetermined point 109 in laser focal plane 108 overlap in time.

A combination of the additional flow characteristic of gas 101 at the additional predetermined point and the flow characteristic of gas 101 at predetermined point 109 provide a more comprehensive analysis of the flow conditions within chamber 102 than either one of these flow characteristics on its own. The cumulative effect is achieved when the corresponding values of these flow characteristics are obtained within the same timeframe. In other words, both values characterize the same gas flow condition within the chamber.

For example, identifying the value of the additional flow characteristic of gas 101 at the additional predetermined point and identifying the value of the flow characteristic of gas 101 at predetermined point 109 can start and end at the same time. In other examples, the start time and/or end time can be different. In other words, these two identification operations are staggered in time.

Referring generally to FIGS. 1 and 4 and particularly to, e.g., FIGS. 2B-2D for illustrative purposes only and not by way of limitation, the following portion of this paragraph delineates example 33 of the subject matter, disclosed herein. According to example 33, which encompasses example 31, above, flow-characterization system 150 further comprises actuator 159, coupled to extensible pressure probe 153. The step of (block 425) identifying the value of the additional flow characteristic of gas 101 at the additional predetermined point, spaced away from laser focal plane 108, using extensible pressure probe 153, comprises (block 426) moving extensible pressure probe 153 relative to datum surface 156 of reference plate 154 in a direction, perpendicular to datum surface 156 using actuator 159.

Actuator 159 enables the position of extensible pressure probe 153 to be changed relative to datum surface 156, e.g., as schematically shown in FIGS. 2C and 2D. As such, actuator 159 controls the position of the additional predetermined point relative to datum surface 156. This position can be changed, using actuator 159, to obtain even more values, each corresponding to a different position of the additional predetermined point relative to datum surface 156 of reference plate 154.

Various examples of actuator 159 are contemplated, such as motorized threaded rods, pneumatic cylinders, scotch yokes, and solenoids. Actuator 159 can be positioned within an enclosure of flow-characterization system 150 to prevent interference with the gas flow within chamber 102. For example, actuator 159 can be positioned below datum surface 156, relative to laser 106.

Referring generally to FIGS. 1 and 4 and particularly to, e.g., FIGS. 2C and 2D for illustrative purposes only and not by way of limitation, the following portion of this paragraph delineates example 34 of the subject matter, disclosed herein. According to example 34, which encompasses example 33, above, method 300 further comprises a step of (block 427) identifying, at additional predetermined points, values of additional flow characteristics of gas 101. At least one of the additional predetermined points is farther away from laser focal plane 108 than at least another one of the additional predetermined points.

Measuring the flow characteristics of gas 101 at additional points provides additional input, resulting in a more comprehensive analysis of the flow conditions within chamber 102. The laser beam travels from laser 106 to focal plane 108 along the Z-axis of chamber 102. As such, the gas flow at various distances away from laser focal plane 108 can impact the passage of the laser beam. For example, the contamination away from laser focal plane 108 can impact the passage of the laser beam to focal plane 108.

In some examples, these additional predetermined points are selected based on the height of chamber 102, vertical positions of the various inlets and outlets into the chamber, the orientation of the inlets, and other factors.

Referring generally to FIGS. 1 and 4 and particularly to, e.g., FIGS. 2C and 2D for illustrative purposes only and not by way of limitation, the following portion of this paragraph delineates example 35 of the subject matter, disclosed herein. According to example 35, which encompasses example 34, above, the step of (block 427) identifying, at the additional predetermined points, the values of the additional flow characteristics of gas 101 is performed using extensible pressure probe 153.

Extensible pressure probe 153 can change the measurement position relative to datum surface 156 of reference plate 154 and also relative to laser focal plane 108. As such, extensible pressure probe 153 can obtain multiple measurements within chamber 102, which provide a more comprehensive analysis of the flow conditions within chamber 102.

In some examples, these additional predetermined points are selected based on the height of chamber 102, vertical positions of the various inlets and outlets into the chamber, the orientation of the inlets, and other factors.

Referring generally to FIGS. 1 and 4 and particularly to, e.g., FIG. 2B for illustrative purposes only and not by way of limitation, the following portion of this paragraph delineates example 36 of the subject matter, disclosed herein. According to example 36, which encompasses any one of examples 21 to 35, second set of process parameters 162 is determined based on the value of the simulated-flow characteristic of gas 101 at the predetermined point away from laser focal plane 108 and further based on first set of process parameters 161.

The value of the simulated-flow characteristic of gas 101 at tje predetermined point away from laser focal plane 108 is used as feedback for determining second set of process parameters 162. This value indicates how first set of process parameters 161 needs to be adjusted, producing second set of process parameters 162. The adjustment level can depend, for example, on the difference between the value of the simulated-flow characteristic of gas 101 at tje predetermined point away from laser focal plane 108 and the desired value of the simulated-flow characteristic.

Referring generally to FIGS. 1 and 4 and particularly to, e.g., FIG. 2B for illustrative purposes only and not by way of limitation, the following portion of this paragraph delineates example 37 of the subject matter, disclosed herein. According to example 37, which encompasses any one of examples 21 to 35, second set of process parameters 162 is determined based on the value of flow characteristic of gas 101 at predetermined point 109 in laser focal plane 108 and further based on the value of the simulated-flow characteristic of gas 101 at the predetermined point away from laser focal plane 108.

The value of the flow characteristic of gas 101 at predetermined point 109 in laser focal plane 108 and the value of the simulated-flow characteristic of gas 101 at the predetermined point away from laser focal plane 108 provides additional feedback for determining second set of process parameters 162. For example, these values can be compared to the corresponding reference values. These reference values can be obtained during the qualification and validation of additive-manufacturing machine 100.

Referring generally to FIGS. 1 and 4 and particularly to, e.g., FIG. 2B for illustrative purposes only and not by way of limitation, the following portion of this paragraph delineates example 38 of the subject matter, disclosed herein. According to example 38, which encompasses any one of examples 21 to 37, method 300 further comprises (block 460) selecting the first set of process parameters 161 for operating additive-manufacturing machine 100 when the difference between the value of simulated-flow characteristic of gas 101 at the predetermined point away from laser focal plane 108 and the desired value of the simulated-flow characteristic is within the predetermined range.

The difference between the value of the simulated-flow characteristic of gas 101 at the predetermined point away from laser focal plane 108 and the desired value of the simulated-flow characteristic is within the predetermined range indicates when process parameters can be used for operating additive-manufacturing machine 100. In other words, the value of simulated-flow characteristic provides feedback about the process parameters and whether these parameters can be used for operating additive-manufacturing machine 100. When the difference is within the predetermined range for first set of process parameters 161, first set of process parameters 161 can be selected for operating additive-manufacturing machine 100.

Referring generally to FIGS. 1 and 4 and particularly to, e.g., FIG. 2A for illustrative purposes only and not by way of limitation, the following portion of this paragraph delineates example 39 of the subject matter, disclosed herein. According to example 39, which encompasses example 38, above, method 400 further comprises (block 470) selecting the value of the flow characteristic of gas 101 at the predetermined point in laser focal plane 108 as a reference test parameter for operating additive-manufacturing machine 100.

When the difference between the value of the physical property at predetermined location 192 on or underneath test-coupon peripheral surface 191 and the desired value of the physical property is within the predetermined range for first set of process parameters 161, first set of process parameters 161 can be selected for operating additive-manufacturing machine 100. First set of process parameters 161 are controlled externally and, in some examples, are not able to account for some internal variations of additive-manufacturing machine 100 (e.g., filter cleanness). At the same time, first set of process parameters 161 was previously used to flow gas 101 within chamber 102 and to identify the value of the flow characteristic of gas 101 at the predetermined point in laser focal plane 108. The value of the flow characteristic of gas 101 accounts for various internal variations of additive-manufacturing machine 100 (in addition to changes to first set of process parameters 161). As such, the value of the flow characteristic of gas 101 can be used for internal control and, more generally, as a reference test parameter for operating additive-manufacturing machine 100.

For example, flow-characterization system 150 can be periodically installed into additive-manufacturing machine 100, and gas 101 is flown within chamber 102 in accordance with first set of process parameters 161. Flow-characterization system 150 determined the value of the flow characteristic of gas 101 at the predetermined point in laser focal plane 108 and this value can be compared to the reference test parameter to ensure that no changes to additive-manufacturing machine 100 have occurred and that additive-manufacturing machine 100 can continue to operate.

Figure 5:
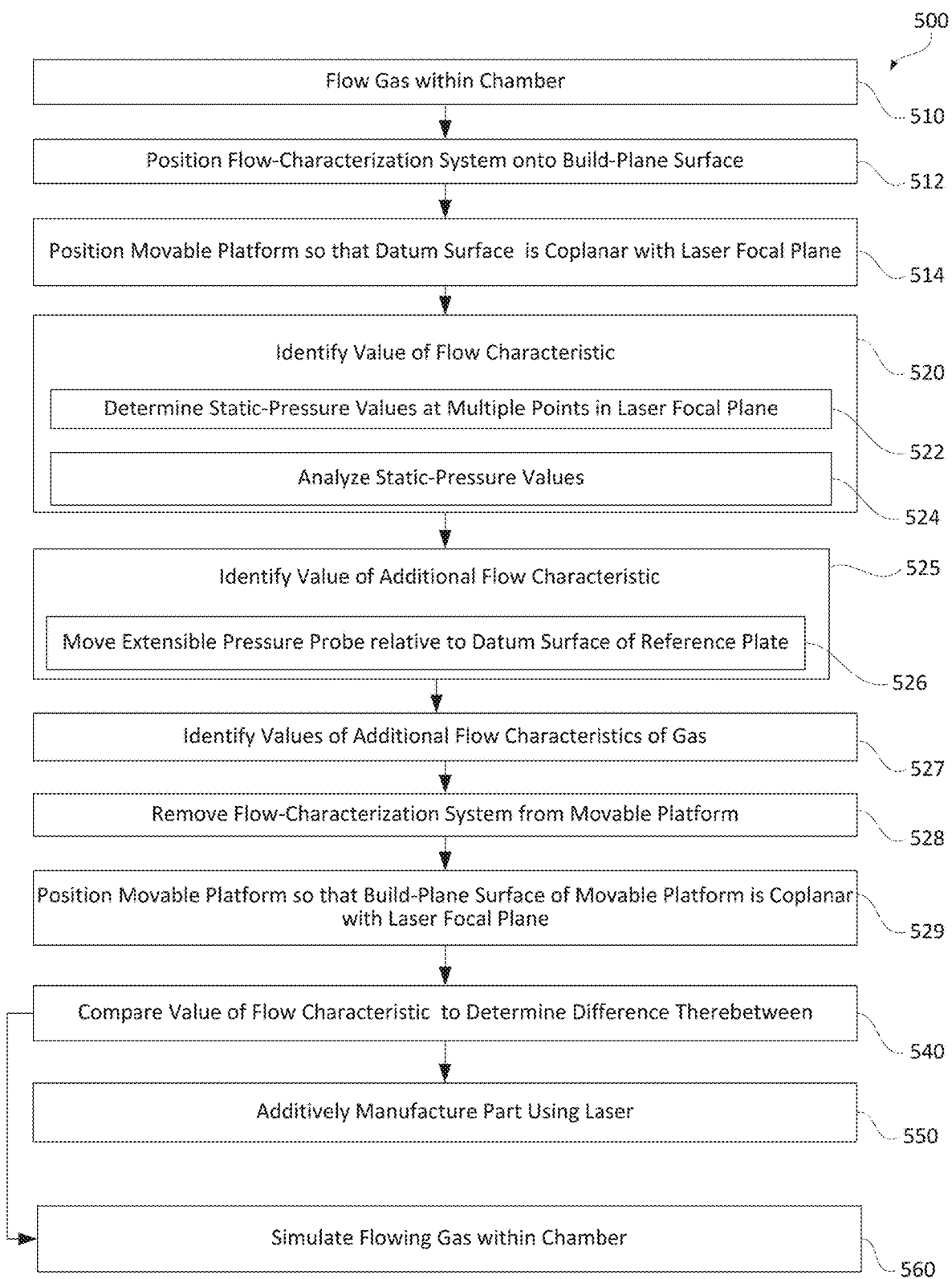

Referring generally to FIGS. 1 and 5 and particularly to, e.g., FIGS. 2B-2E for illustrative purposes only and not by way of limitation, the following portion of this paragraph delineates example 40 of the subject matter, disclosed herein. According to example 40, method 500 of monitoring operation of additive-manufacturing machine 100 that comprises chamber 102, platform 107, movable inside chamber 102 and comprising build-plane surface 105, and laser 106, having laser focal plane 108 within chamber 102, is provided. Method 500 comprises a step of (block 510) flowing gas 101 within chamber 102 in accordance with first set of process parameters 161. Method 300 also comprises a step of (block 520) identifying a value of a flow characteristic of gas 101 at a predetermined point in laser focal plane 108 while flowing gas 101 within chamber 102 in accordance with first set of process parameters 161. Method 300 further comprises a step of (block 540) comparing the value of flow characteristic of gas 101 at the predetermined point in laser focal plane 108 to a desired value of flow characteristic to determine a difference therebetween. Method 300 additionally comprises a step of (block 550) additively manufacturing part 198, using laser 106, while flowing gas 101 within chamber 102 in accordance with first set of process parameters 161, only when the difference between the value of flow characteristic of gas 101 at the predetermined point in laser focal plane 108 and the desired value of flow characteristic is within a predetermined range.

The desired value of flow characteristics can be used as a direct reference to determine if additive-manufacturing machine 100 is ready for manufacturing part 198. This direct reference eliminates the need for additively manufacturing test coupons and testing these coupons thereafter. Furthermore, this direct reference eliminates the need for simulations and computational-fluid-dynamics analysis. For example, the desired value of flow characteristic can be established previously during validation and/or qualification of additive-manufacturing machine 100.

Gas 101 is flown using various components of additive-manufacturing machine 100 as, e.g., is shown in FIG. 2B. For example, fan 118 directs gas 101 to inlet 112 and additional inlet 113, through which gas 101 enters chamber 102. Gas 101 passes through chamber 102 and exits through outlet 114. In some examples, gas 101 is passed through filter 116 to remove any contaminants before being returned back into chamber 102. This recirculation of gas 101 through chamber 102 removes contaminants and helps to keep the laser path unobstructed. The effectiveness of this gas recirculation process depends on the flow characteristic of gas 101. The flow characteristic is identified at one or more specific locations within chamber 102, such as predetermined point 109 in laser focal plane 108 while flowing gas 101 within chamber 102. Furthermore, the flow characteristic of gas 101 or, more specifically, the value of the flow characteristic of gas 101 depends on the process parameters (e.g., first set of process parameters 161) within chamber 102.

Referring generally to FIGS. 1 and 5 and particularly to, e.g., FIG. 2B for illustrative purposes only and not by way of limitation, the following portion of this paragraph delineates example 41 of the subject matter, disclosed herein. According to example 41, which encompasses example 40, above, method 500 further comprises, based on the value of flow characteristic of gas 101 at the predetermined point in laser focal plane 108, (block 560) simulating the step of flowing gas 101 within chamber 102 in accordance with first set of process parameters 161 so that a value of a simulated-flow characteristic of gas 101 is identified. First set of process parameters 161 is selected to be suitable for operating additive-manufacturing machine 100 only when the difference between the value of the simulated-flow characteristic of gas 101 at the predetermined point away from laser focal plane 108 and a desired value of simulated-flow characteristic is within a predetermined simulated range.

Simulating the step of flowing gas 101 within chamber 102 based on the value of flow characteristic of gas 101 at the predetermined point in laser focal plane 108 can be used instead of additively manufacturing test coupon (e.g., to expedite the system qualification) or in addition to additively manufacturing the test coupon (e.g., to provide additional feedback). First set of process parameters 161 is used as an input to this simulation. As such, any changes to these process parameters can result in changes to the value of the simulated-flow characteristic of gas 101 at the predetermined point away from laser focal plane 108. This feedback is used to determine process parameters that yield the desired value of the simulated-flow characteristic, e.g., the one within the predetermined range.

Process parameters can be changed (e.g., from first set of process parameters 161 to second set of process parameters 162) until the difference between the value of the simulated-flow characteristic and the desired value of the physical property is within the predetermined range.

Referring generally to FIGS. 1 and 5 and particularly to, e.g., FIGS. 2B, 2C, and 2E for illustrative purposes only and not by way of limitation, the following portion of this paragraph delineates example 42 of the subject matter, disclosed herein. According to example 42, which encompasses of example 40 or 41, above, first set of process parameters 161 comprises at least one of a fan speed, a filter type, or an orientation of a flow curtain within chamber 102.

The flow characteristic of gas 101 or, more specifically, the value of the flow characteristic of gas 101 depends on the process parameters (e.g., first set of process parameters 161, second set of process parameters 162) within chamber 102. At the same time, the flow characteristic of gas 101 has an impact on the physical properties of test coupon 190 or, more specifically, the physical property at predetermined location 192 on or underneath test-coupon peripheral surface 191. As such, these process parameters have an impact on the physical property at predetermined location 192 on or underneath test-coupon peripheral surface 191. Controlling each of these process parameters helps to achieve the desired physical property, e.g., when the difference between the value of the physical property at predetermined location 192 on or underneath test-coupon peripheral surface 191 and the desired value of the physical property is within the predetermined range.

For example, a higher fan speed increases the speed, at which gas 101 is flown within chamber 102, and can help with faster and more efficient removal of contaminants from chamber 102. A higher fan speed can be used, e.g., when the contamination level within chamber 102 is otherwise high and interferes with the laser beam as the laser beam passes from laser 106 to laser focal plane 108. However, excessive fan speeds can cause turbulence, vortexes, and other undesirable phenomena, which can be captured as the flow characteristic of gas 101. A filter type also impacts the speed, at which gas 101 can be flown within chamber 102, e.g., how much restriction to the gas flow is presented by filter 116. However, a filter type also determines the amount and the type of contaminants, removed from gas 101 before gas 101 is reintroduced into chamber 102. In some examples, one or more flow curtains are used within chamber 102 to redirect gas 110 within chamber 102, in addition to the initial direction, provided by the inlets.

Referring generally to FIGS. 1 and 5 and particularly to, e.g., FIGS. 2B, 2C, and 2E for illustrative purposes only and not by way of limitation, the following portion of this paragraph delineates example 43 of the subject matter, disclosed herein. According to example 43, which encompasses any one of examples 40 to 42, above, the step of (block 520) identifying the value of flow characteristic of gas 101 at the predetermined point in laser focal plane 108 comprises (block 522) determining static-pressure values at multiple points in laser focal plane 108 and (block 524)

analyzing the static-pressure values to determine the value of flow characteristic of gas 101 at predetermined point 109 in laser focal plane 108.

The static-pressure values at multiple points in laser focal plane 108 are representative of the various flow characteristics of gas 101, such as the direction of gas 101 within chamber 102 and the speed, at which gas 101 travels through chamber 102. For example, the static-pressure difference between two points can be used for these purposes. The locations of these points determine which flow characteristics of gas 101 can be identified.

FIG. 2E illustrates multiple points (identified as reference-plate openings 158 in reference plate 154 of flow-characterization system 150). In some examples, the difference or, more generally, the variations of the static-pressure values among different points in laser focal plane 108 can be used to determine the value of flow characteristic of gas 101 at predetermined point 109 in laser focal plane 108. For example, two points, located along the X-axis, can have different static-pressure values. This difference can be correlated to the gas flow along the X-axis. In some examples, predetermined point 109 in laser focal plane 108 coincides with one of the multiple points in laser focal plane 108, at which the static-pressure values are identified. Alternatively, predetermined point 109 in laser focal plane 108 is positioned between two or more of the multiple points in laser focal plane 108.

Referring generally to FIGS. 1 and 5 and particularly to, e.g., FIG. 2B for illustrative purposes only and not by way of limitation, the following portion of this paragraph delineates example 44 of the subject matter, disclosed herein. According to example 44, which encompasses example 43, above, the static-pressure values at the multiple points in laser focal plane 108 within chamber 102 are determined using computational-fluid-dynamics analysis.

Computational-fluid-dynamics analysis enables the static-pressure values at the multiple points in laser focal plane 108 within chamber 102 to be determined without performing an actual test and using any test probes, thereby saving time and eliminating the need for test equipment.

In some examples, computational-fluid-dynamics analysis enables the static-pressure values at any locations in laser focal plane 108 within chamber 102 to be determined. Furthermore, in some examples, computational-fluid-dynamics analysis enables these locations to be changed as needed, e.g., to provide a more specific correlation to the value of the physical property at predetermined location 192 on or underneath test-coupon peripheral surface 191.

Referring generally to FIGS. 1 and 5 and particularly to, e.g., FIGS. 2A and 23 for illustrative purposes only and not by way of limitation, the following portion of this paragraph delineates example 45 of the subject matter, disclosed herein. According to example 45, which encompasses any one of examples 40 to 44, above, the flow characteristic of gas 101 is a linear flowrate of gas 101 at predetermined point 109 in laser focal plane 108.

The linear flowrate of gas 101 at predetermined point 109 in laser focal plane 108 is an indication of how fast contaminants are being removed from chamber 102. Furthermore, the linear flowrate of gas 101 can impact thermal conditions during sintering, e.g., a higher flowrate corresponding to more cooling. It should be noted that laser focal plane 108 is where the sintering occurs during additive manufacturing.

In some examples, multiple linear flowrates of gas 101 are measured within chamber 102, e.g., flowrates in different directions at predetermined point 109 in laser focal plane 103 or flowrates at different points, e.g., within laser focal plane 108 and/or away from laser focal plane 108.

Referring generally to FIGS. 1 and 5 and particularly to, e.g., FIG. 2B for illustrative purposes only and not by way of limitation, the following portion of this paragraph delineates example 46 of the subject matter, disclosed herein. According to example 46, which encompasses any one of examples 40 to 45, laser 106 is not operational during the step of (block 520) identifying the value of flow characteristic of gas 101.

With laser 106 not being operational, various metrology tools can be positioned within chamber 102 to determine the flow characteristic of gas 101 and without any risk of being damaged by laser 106. For example, flow-characterization system 150 can be placed on platform 107 of additive-manufacturing machine 100 to determine the flow characteristic of gas 101. It should be noted that platform 107 is in the direct line of sight of laser 106.

The operation of laser 106 does not impact the flow characteristic of gas 101 within chamber 102. As such, the value of the flow characteristic of gas 101 at predetermined point 109 in laser focal plane 108 while flowing gas 101 within chamber 102 in accordance with first set of process parameters 161 will be the same when laser 106 is operational and when laser 106 is not operational.

Referring generally to FIGS. 1 and 5 and particularly to, e.g., FIGS. 2B-2E for illustrative purposes only and not by way of limitation, the following portion of this paragraph delineates example 47 of the subject matter, disclosed herein. According to example 47, which encompasses any one of examples 40 to 46, the step of (block 520) identifying the value of flow characteristic of gas 101 at the predetermined point in laser focal plane 108 is performed using flow-characterization system 150, comprising pressure probes 152 and reference plate 154 that comprises datum surface 156 and reference-plate openings 158, passing through datum surface 156. Datum surface 156 is coplanar with laser focal plane 108 during the step of (block 520) identifying the value of flow characteristic of gas 101. Each of pressure probes 152 is received by a respective one of reference-plate openings 158 and is configured to monitor static pressure at datum surface 156 of reference plate 154.

Flow-characterization system 150 is specifically configured for identifying the value of flow characteristic of gas 101 at the predetermined point in laser focal plane 108. The predetermined point in laser focal plane 108 is determined by the position of reference-plate openings 158 or, more specifically, by pressure probes 152, positioned in reference-plate openings 158. Pressure probes 152 obtained various characteristics, which are combined to identify the value of flow characteristic of gas 101 at the predetermined point in laser focal plane 108.

Flow-characterization system 150 is positioned on platform 107 when laser 106 is not operational. As such, flow-characterization system 150 is not damaged by laser 106 while identifying the value of flow characteristic of gas 101 at the predetermined point in laser focal plane 108. Flow-characterization system 150 comprises pressure probes 152 for determining, e.g., static pressure at multiple locations. Flow-characterization system 150 also comprises reference plate 154 that comprises datum surface 156 and reference-plate openings 158, passing through datum surface 156. Datum surface 156 is coplanar with laser focal plane 108 while identifying the value of flow characteristic of gas 101. This positioning ensures that the flow characteristic of gas 101 is determined at the predetermined point in laser focal plane 108 (and not away from laser focal plane 108). Each of pressure probes 152 is received by a respective one of reference-plate openings 158. In other words, reference-plate openings 158 determine the locations of pressure probes 152. Referring to FIG. 2C, in some examples, pressure probes 152 are positioned below datum surface 156 to ensure that the static pressure (at datum surface 156 of reference plate 154) is accurately measured and not impacted by the flow of gas 101 above datum surface 156.

Referring generally to FIGS. 1 and 5 and particularly to, e.g., FIG. 2B for illustrative purposes only and not by way of limitation, the following portion of this paragraph delineates example 48 of the subject matter, disclosed herein. According to example 48, which encompasses example 47, above, method 300 further comprises, prior to the step of (block 520) identifying the value of the flow characteristic of gas 101 at predetermined point 109 in laser focal plane 108, (block 512) positioning flow-characterization system 150 onto build-plane surface 105 of platform 107. Method 300 also comprises (block 514) positioning platform 107 so that datum surface 156 of reference plate 154 of flow-characterization system 150 is coplanar with laser focal plane 108.

Platform 107 provides the alignment of datum surface 156, relative to laser focal plane 108 or, more specifically, ensures that datum surface 156 is coplanar with laser focal plane 108. This alignment ensures that the flow characteristic of gas 101 is determined at the predetermined point in laser focal plane 108 (and not away from laser focal plane 108).

For example, flow-characterization system 150 has a height (extending in the Z-direction). This height ensures that various external components of flow-characterization system 150 can be arranged and, if needed, accessed (e.g., while servicing flow-characterization system 150). Before positioning flow-characterization system 150, platform 107 can be positioned such that a powder layer is at laser focal plane 108. However, this powder layer can be much thinner/shorter than flow-characterization system 150. As such, if flow-characterization system 150 is positioned on platform 107 without adjusting the height of platform 107, then datum surface 156 will be above laser focal plane 108. Taking measurements at this location (above laser focal plane 108) are not useful, at least for some application. Platform 107 is therefore lowered until datum surface 156 is coplanar with laser focal plane 108.

Referring generally to FIGS. 1 and 5 and particularly to, e.g., FIG. 2B for illustrative purposes only and not by way of limitation, the following portion of this paragraph delineates example 49 of the subject matter, disclosed herein. According to example 49, which encompasses example 47 or 48, above, method 300 further comprises, after the step of (block 520) identifying the value of the flow characteristic of gas 101 at the predetermined point in laser focal plane 108 and prior to the step of (block 550) additively manufacturing part 198, (block 528) removing flow-characterization system 150 from platform 107 and (block 529) positioning platform 107 so that build-plane surface 105 of platform 107 is coplanar with laser focal plane 108.

Once the value of the flow characteristic of gas 101 is identified, flow-characterization system 150 is removed from platform 107. It should be noted that during the operation of flow-characterization system 150, build-plane surface 105 of platform 107 is below laser focal plane 108, while datum surface 156 of reference plate 154 of flow-characterization system 150 is coplanar with laser focal plane 108. Once the value of the flow characteristic of gas 101 is identified, additive-manufacturing machine 100 needs to be returned to an operational state, in which build-plane surface 105 of platform 107 is coplanar with laser focal plane 108. As such, platform 107 is raised until build-plane surface 105 is coplanar with laser focal plane 108. In this state, build-plane surface 105 of platform 107 is ready to receive a precursor (e.g., powder) for additive manufacturing.

In some examples, platform 107 is equipped with one or more linear actuators used for lowering and raising platform 107. Some examples include, but are not limited to threaded rods, pneumatic cylinders, scotch yokes, and solenoids.

Referring generally to FIGS. 1 and 5 and particularly to, e.g., FIGS. 2B-2D for illustrative purposes only and not by way of limitation, the following portion of this paragraph delineates example 50 of the subject matter, disclosed herein. According to example 50, which encompasses any one of examples 47 to 49, flow-characterization system 150 further comprises extensible pressure probe 153, protruding above datum surface 156 of reference plate 154. Method 300 further comprises a step of (block 525) identifying a value of an additional flow characteristic of gas 101 at an additional predetermined point, spaced away from laser focal plane 108, using extensible pressure probe 153.

The value of the additional flow characteristic of gas 101 at the additional predetermined point, spaced away from laser focal plane 108, provides an additional characterization of the gas flow within chamber 102. This value can be used together with the value of the physical property at predetermined location 192 on or underneath test-coupon peripheral surface 191 to provide a more comprehensive view of the gas flow within chamber 102.

For example, the value of the additional flow characteristic of gas 101 at the additional predetermined point can be compared with the value of the flow characteristic of gas 101 at predetermined point 109, e.g., to determine any variations of the flow characteristic along the t-axis of chamber 102. It should be noted that the laser beam travels from laser 106 to focal plane 108 along the Z-axis of chamber 102. As such, the value of the additional flow characteristic of gas 101 at the additional predetermined point provides additional input.

Extensible pressure probe 153 can be supported using reference plate 154 as, e.g, is shown in FIGS. 2C and 2D. In some examples, inlet probe 157 is used to identify the value of the additional flow characteristic of gas 101 at the additional predetermined point, spaced away from laser focal plane 108. This additional predetermined point can be positioned at one of the chamber inlets as, e.g., is schematically shown in FIG. 2B.

Referring generally to FIGS. 1 and 5 and particularly to, e.g., FIGS. 2B-2D for illustrative purposes only and not by way of limitation, the following portion of this paragraph delineates example 51 of the subject matter, disclosed herein. According to example 51, which encompasses example 50, above, the step of (block 525) identifying the value of the additional flow characteristic of gas 101 at the additional predetermined point, spaced away from laser focal plane 108, using extensible pressure probe 153, and the step of (block 520) identifying the value of the flow characteristic of gas 101 at predetermined point 109 in laser focal plane 108 overlap in time.

A combination of the additional flow characteristic of gas 101 at the additional predetermined point and the flow characteristic of gas 101 at predetermined point 109 provide a more comprehensive analysis of the flow conditions within chamber 102 than either one of these flow characteristics on its own. The cumulative effect is achieved when the corresponding values of these flow characteristics are obtained within the same timeframe. In other words, both values characterize the same gas flow condition within the chamber.

For example, identifying the value of the additional flow characteristic of gas 101 at the additional predetermined point and identifying the value of the flow characteristic of gas 101 at predetermined point 109 can start and end at the same time. In other examples, the start time and/or end time can be different. In other words, these two identification operations are staggered in time.

Referring generally to FIGS. 1 and 5 and particularly to, e.g., FIGS. 2B-2D for illustrative purposes only and not by way of limitation, the following portion of this paragraph delineates example 52 of the subject matter, disclosed herein. According to example 52, which encompasses example 50, above, flow-characterization system 150 further comprises actuator 159, coupled to extensible pressure probe 153. The step of (block 525) Identifying the value of the additional flow characteristic of gas 101 at the additional predetermined point, spaced away from laser focal plane 108, using extensible pressure probe 153, comprises (block 526) moving extensible pressure probe 153 relative to datum surface 156 of reference plate 154 in a direction, perpendicular to datum surface 156 using actuator 159.

Actuator 159 enables the position of extensible pressure probe 153 to be changed relative to datum surface 156, e.g., as schematically shown in FIGS. 2C and 2D. As such, actuator 159 controls the position of the additional predetermined point relative to datum surface 156. This position can be changed, using actuator 159, to obtain even more values, each corresponding to a different position of the additional predetermined point relative to datum surface 156 of reference plate 154.

Various examples of actuator 159 are contemplated, such as motorized threaded rods, pneumatic cylinders, scotch yokes, and solenoids. Actuator 159 can be positioned within an enclosure of flow-characterization system 150 to prevent interference with the gas flow within chamber 102. For example, actuator 159 can be positioned below datum surface 156, relative to laser 106.

Referring generally to FIGS. 1 and 5 and particularly to, e.g., FIGS. 2C and 2D for illustrative purposes only and not by way of limitation, the following portion of this paragraph delineates example 53 of the subject matter, disclosed herein. According to example 53, which encompasses example 52, above, method 300 further comprises a step of (block 527) identifying, at additional predetermined points, the values of additional flow characteristics of gas 101. At least one of the additional predetermined points is farther away from laser focal plane 108 than at least another one of the additional predetermined points.

Measuring the flow characteristics of gas 101 at additional points provides additional input, resulting in a more comprehensive analysis of the flow conditions within chamber 102. The laser beam travels from laser 106 to focal plane 108 along the Z-axis of chamber 102. As such, the gas flow at various distances away from laser focal plane 108 can impact this laser-beam travel. For example, the contamination away from laser focal plane 108 can impact the passage of the laser beam to focal plane 108.

In some examples, these additional predetermined points are selected based on the height of chamber 102, vertical positions of the various inlets and outlets into the chamber, the orientation of the inlets, and other factors.

Referring generally to FIGS. 1 and 5 and particularly to, e.g., FIGS. 2C and 2D for illustrative purposes only and not by way of limitation, the following portion of this paragraph delineates example 54 of the subject matter, disclosed herein. According to example 54, which encompasses example 53, above, the step of (block 527) identifying, at the additional predetermined points, the values of the additional flow characteristics of gas 101 is performed using extensible pressure probe 153.

Extensible pressure probe 153 can change the measurement position relative to datum surface 156 of reference plate 154 and also relative to laser focal plane 108. As such, extensible pressure probe 153 can obtain multiple measurements within chamber 102, which provide a more comprehensive analysis of the flow conditions within chamber 102.

In some examples, these additional predetermined points are selected based on the height of chamber 102, vertical positions of the various inlets and outlets into the chamber, the orientation of the inlets, and other factors.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A method of configuring an additive-manufacturing machine that comprises a chamber, a platform, movable inside the chamber and comprising build-plane surface, and a laser, having a laser focal plane within the chamber, the method comprising steps of: flowing a gas within the chamber in accordance with a first set of process parameters; identifying a value of a flow characteristic of the gas at a predetermined point in the laser focal plane while flowing the gas within the chamber in accordance with the first set of process parameters, wherein the step of identifying the value of the flow characteristic of the gas at the predetermined point is performed using a flow-characterization system, comprising: pressure probes and a reference plate that comprises a datum surface and reference-plate openings, passing through the datum surface, wherein the datum surface is coplanar with the laser focal plane during the step of identifying the value of the flow characteristic of the gas, and wherein each of the pressure probes is received by a respective one of the reference plate openings and is configured to monitor static pressure at the datum surface of the reference plate, and an extensible pressure probe, protruding above the datum surface of the reference plate; identifying a value of an additional flow characteristic of the gas at an additional predetermined point, spaced away from the laser focal plane, using the extensible pressure probe; additively manufacturing a test coupon using the laser while flowing the gas within the chamber in accordance with the first set of process parameters, wherein the test coupon has a test-coupon peripheral surface; comparing a value of a physical property at a predetermined location on or underneath the test-coupon peripheral surface to a desired value of the physical property; and flowing the gas within the chamber in accordance with a second set of process parameters, different from the first set of process parameters, when a difference between the value of the physical property at the predetermined location on or underneath the test-coupon peripheral surface and the desired value of the physical property is outside of a predetermined range.

2. The method according to claim 1, wherein each of the first set of process parameters and the second set of process parameters comprises at least one of a fan speed, a filter type, or an orientation of a flow curtain within the chamber.

3. The method according to claim 1, wherein the flow characteristic of the gas is a linear flowrate of the gas at the predetermined point in the laser focal plane.

4. The method according to claim 1, wherein the laser is not operational during the step of identifying the value of the flow characteristic of the gas.

5. The method according to claim 1, further comprising:
prior to the step of identifying the value of the flow characteristic of the gas at the predetermined point in the laser focal plane, positioning the flow-characterization system onto the build-plane surface of the platform; and
positioning the platform so that the datum surface of the reference plate of the flow-characterization system is coplanar with the laser focal plane.

6. The method according to claim 1, further comprising, after the step of identifying the value of the flow characteristic of the gas at the predetermined point in the laser focal plane and prior to the step of additively manufacturing the test coupon:
removing the flow-characterization system from the platform; and
positioning the platform so that the build-plane surface of the platform is coplanar with the laser focal plane.

7. The method according to claim 1, wherein each of the first set of process parameters and the second set of process parameters comprises a fan speed or an orientation of a flow curtain within the chamber.

8. The method according to claim 1, wherein the second set of process parameters is determined based on the value of the physical property at the predetermined location on or underneath the test-coupon peripheral surface and further based on the first set of process parameters.

9. The method according to claim 1, wherein the second set of process parameters is determined based on the value of the flow characteristic of the gas at the predetermined point in the laser focal plane and further based on the value of the physical property at the predetermined location on or underneath the test-coupon peripheral surface.

10. The method of claim 1, further comprising steps of:
identifying a value of the flow characteristic of the gas at the predetermined point in the laser focal plane while flowing the gas within the chamber in accordance with the second set of process parameters;
additively manufacturing a second test coupon using the laser while flowing the gas in the chamber in accordance with the second set of process parameters, wherein the second test coupon has a second-test-coupon peripheral surface;
comparing a value of the physical property at a second predetermined location on or underneath the second-test-coupon peripheral surface to the desired value of the physical property; and
flowing the gas within the chamber in accordance with a third set of process parameters, different from the first set of process parameters and from the second set of process parameters, when a difference between the value of the physical property at the second predetermined location on or underneath the second-test-coupon peripheral surface and the desired value of the physical property is outside of the predetermined range.

11. The method according to claim 1, wherein the step of additively manufacturing the test coupon comprises:
placing a powder layer onto the build-plane surface of the platform; and
heating the powder layer with the laser to locally melt the powder layer.

12. The method according to claim 1, wherein the step of identifying the value of the flow characteristic of the gas at the predetermined point in the laser focal plane comprises:
determining static-pressure values at multiple points in the laser focal plane, and
analyzing the static-pressure values to determine the value of the flow characteristic of the gas at the predetermined point in the laser focal plane.

13. The method according to claim 12, wherein the static-pressure values at the multiple points in the laser focal plane within the chamber are determined using computational-fluid-dynamics analysis.

14. The method according to claim 1, wherein the step of identifying the value of the additional flow characteristic of the gas at the additional predetermined point, spaced away from the laser focal plane, using the extensible pressure probe and the step of identifying the value of the flow characteristic of the gas at the predetermined point in the laser focal plane overlap in time.

15. The method according to claim 14, wherein:
the flow-characterization system further comprises an actuator, coupled to the extensible pressure probe; and
the step of identifying the value of the additional flow characteristic of the gas at the additional predetermined point, spaced away from the laser focal plane, using the extensible pressure probe, comprises moving the extensible pressure probe relative to the datum surface of the reference plate in a direction perpendicular to the datum surface using the actuator.

16. The method according to claim 14, further comprising a step of identifying, at additional predetermined points, values of additional flow characteristics of the gas, wherein at least one of the additional predetermined points is farther away from the laser focal plane than at least another one of the additional predetermined points.

17. The method according to claim 16, wherein the step of identifying, at the additional predetermined points, the additional flow characteristics of the gas is performed using the extensible pressure probe.

18. The method according to claim 1, further comprising selecting the first set of process parameters for operating the additive-manufacturing machine when the difference between the value of the physical property at the predetermined location on or underneath the test-coupon peripheral surface and the desired value of the physical property is within the predetermined range.

19. The method according to claim 18, further comprising selecting the value of the flow characteristic of the gas at the predetermined point in the laser focal plane as a reference test parameter for operating the additive-manufacturing machine.

* * * * *